US007827156B2

(12) United States Patent
Waxman et al.

(10) Patent No.: US 7,827,156 B2
(45) Date of Patent: Nov. 2, 2010

(54) ISSUING A DIGITAL RIGHTS MANAGEMENT (DRM) LICENSE FOR CONTENT BASED ON CROSS-FOREST DIRECTORY INFORMATION

(75) Inventors: Peter David Waxman, Bellevue, WA (US); Chandramouli Venkatesh, Sammamish, WA (US); Yevgeniy Eugene Rozenfeld, Sammamish, WA (US); Attila Narin, Bothell, WA (US)

(73) Assignee: Microsoft Corporation, Redmond, WA (US)

(*) Notice: Subject to any disclaimer, the term of this patent is extended or adjusted under 35 U.S.C. 154(b) by 1001 days.

(21) Appl. No.: 10/374,321

(22) Filed: Feb. 26, 2003

(65) Prior Publication Data

US 2004/0168077 A1  Aug. 26, 2004

(51) Int. Cl.
*G06F 7/00* (2006.01)
*G06F 17/00* (2006.01)
*G06F 17/30* (2006.01)
(52) U.S. Cl. .................. 707/694; 707/696; 707/758
(58) Field of Classification Search ............... 709/225, 709/229; 707/9, 200; 713/155, 156; 726/2, 726/17
See application file for complete search history.

(56) References Cited

U.S. PATENT DOCUMENTS

| 5,204,897 | A |   | 4/1993 | Wyman |
| 5,260,999 | A |   | 11/1993 | Wyman |
| 5,335,346 | A |   | 8/1994 | Fabbio |
| 5,438,508 | A |   | 8/1995 | Wyman |
| 5,623,666 | A | * | 4/1997 | Pike et al. ............... 707/200 |
| 5,715,403 | A |   | 2/1998 | Stefik .................... 395/244 |
| 5,758,069 | A |   | 5/1998 | Olsen |
| 5,761,669 | A |   | 6/1998 | Montague et al. |
| 5,864,620 | A |   | 1/1999 | Pettitt |

(Continued)

FOREIGN PATENT DOCUMENTS

JP  2001175605 A  6/2001

(Continued)

OTHER PUBLICATIONS

Evans, P. "DRM: Is the Road to Adoption Fraught with Potholes?" *Seybold Reporting Analyzing Publishing Technologies*, 2001, 1(14), 32.

(Continued)

*Primary Examiner*—Charles Rones
*Assistant Examiner*—Charles D Adams
(74) *Attorney, Agent, or Firm*—Woodcock Washburn LLP

(57) ABSTRACT

An organization maintains a computer network comprising at least a forest A and a forest B, where forest A has a directory A and a querying entity A capable of querying directory A, and forest B has a directory B and a querying entity B capable of querying directory B. Querying entity A receives a request from the user and decides whether to grant the request based at least in part on whether the user is a member of the group. Thus, querying entity A queries directory A to return information on the group, is directed to forest B, contacts querying entity B, requests querying entity B to query directory B whether the user is a member of the group, receives a response, and grants the request from the user based at least in part on whether the user is a member of the group.

13 Claims, 17 Drawing Sheets

U.S. PATENT DOCUMENTS

| | | | |
|---|---|---|---|
| 5,881,225 A * | 3/1999 | Worth | 726/17 |
| 6,006,332 A | 12/1999 | Rabne et al. | |
| 6,035,402 A * | 3/2000 | Vaeth et al. | 726/2 |
| 6,122,741 A | 9/2000 | Patterson et al. | |
| 6,189,146 B1 | 2/2001 | Misra et al. | |
| 6,219,652 B1 | 4/2001 | Carter et al. | |
| 6,226,618 B1 | 5/2001 | Downs et al. | |
| 6,260,141 B1 | 7/2001 | Park | |
| 6,389,535 B1 | 5/2002 | Thomlinson et al. | |
| 6,446,207 B1 | 9/2002 | Vanstone et al. | |
| 6,460,141 B1 * | 10/2002 | Olden | 726/4 |
| 6,557,105 B1 | 4/2003 | Tardo et al. | |
| 6,574,611 B1 | 6/2003 | Matsuyama et al. | |
| 6,662,228 B1 * | 12/2003 | Limsico | 709/225 |
| 6,701,433 B1 | 3/2004 | Schell et al. | |
| 6,792,537 B1 | 9/2004 | Liu et al. | |
| 6,801,998 B1 | 10/2004 | Hanna et al. | |
| 6,807,542 B2 | 10/2004 | Bantz et al. | |
| 6,824,051 B2 | 11/2004 | Reddy et al. | |
| 6,859,790 B1 | 2/2005 | Nonaka et al. | |
| 6,873,975 B1 | 3/2005 | Hatakeyama et al. | |
| 6,889,246 B1 | 5/2005 | Kawamoto et al. | |
| 6,961,858 B2 | 11/2005 | Fransdonk | |
| 6,973,444 B1 | 12/2005 | Blinn et al. | |
| 6,990,502 B2 | 1/2006 | Waxman et al. | |
| 7,017,188 B1 | 3/2006 | Schmeidler et al. | |
| 7,020,781 B1 | 3/2006 | Saw et al. | |
| 7,036,011 B2 | 4/2006 | Grimes et al. | |
| 7,058,819 B2 | 6/2006 | Okaue | |
| 7,080,077 B2 * | 7/2006 | Ramamurthy et al. | 707/9 |
| 7,213,005 B2 | 5/2007 | Mourad et | |
| 7,228,437 B2 | 6/2007 | Spagna et al. | |
| 7,353,402 B2 | 4/2008 | Bourne et al. | |
| 7,395,245 B2 | 7/2008 | Okamoto et al. | |
| 7,484,103 B2 | 1/2009 | Woo et al. | |
| 7,502,945 B2 | 3/2009 | Bourne et al. | |
| 7,549,060 B2 | 6/2009 | Bourne et al. | |
| 7,577,999 B2 | 8/2009 | Narin et al. | |
| 2001/0010076 A1 | 7/2001 | Wray | |
| 2001/0049787 A1 * | 12/2001 | Morikawa et al. | 713/156 |
| 2001/0053223 A1 | 12/2001 | Ishibashi et al. | |
| 2002/0013772 A1 | 1/2002 | Peinado | |
| 2002/0019814 A1 | 2/2002 | Ganesan | |
| 2002/0026574 A1 | 2/2002 | Watanabe et al. | |
| 2002/0049679 A1 | 4/2002 | Russell et al. | |
| 2002/0065781 A1 | 5/2002 | Hillegass et al. | |
| 2002/0107806 A1 | 8/2002 | Higashi et al. | |
| 2002/0108050 A1 | 8/2002 | Raley et al. | |
| 2002/0112171 A1 | 8/2002 | Ginter et al. | |
| 2002/0118835 A1 | 8/2002 | Uemura | |
| 2002/0144131 A1 | 10/2002 | Spacey | |
| 2002/0184515 A1 | 12/2002 | Oho et al. | |
| 2002/0198845 A1 | 12/2002 | Lao et al. | |
| 2002/0198846 A1 | 12/2002 | Lao | |
| 2003/0018491 A1 | 1/2003 | Nakahara et al. | |
| 2003/0023564 A1 | 1/2003 | Padhye et al. | |
| 2003/0028454 A1 | 2/2003 | Ooho et al. | |
| 2003/0028490 A1 | 2/2003 | Miura et al. | |
| 2003/0046238 A1 | 3/2003 | Nonaka et al. | |
| 2003/0149670 A1 | 8/2003 | Cronce | |
| 2003/0198350 A1 | 10/2003 | Foster et al. | |
| 2003/0236820 A1 | 12/2003 | Tierney et al. | |
| 2004/0001594 A1 | 1/2004 | Krishnaswamy et al. | |
| 2004/0003269 A1 | 1/2004 | Waxman et al. | |
| 2004/0003270 A1 | 1/2004 | Bourne et al. | |
| 2004/0039916 A1 | 2/2004 | Aldis et al. | |
| 2004/0044779 A1 * | 3/2004 | Lambert | 709/229 |
| 2004/0054678 A1 | 3/2004 | Okamoto et al. | |
| 2004/0088541 A1 | 5/2004 | Messerges et al. | |
| 2004/0128499 A1 * | 7/2004 | Peterka et al. | 713/155 |
| 2004/0128546 A1 * | 7/2004 | Blakley et al. | 713/201 |
| 2004/0158731 A1 | 8/2004 | Narin et al. | |
| 2004/0168077 A1 | 8/2004 | Waxman et al. | |
| 2004/0236717 A1 | 11/2004 | Demartini et al. | |
| 2005/0010536 A1 | 1/2005 | Cochran et al. | |
| 2005/0223415 A1 | 10/2005 | Oho et al. | |
| 2005/0289076 A1 | 12/2005 | Lambert | |
| 2006/0168451 A1 | 7/2006 | Ishibashi et al. | |
| 2006/0272026 A1 | 11/2006 | Niwano et al. | |
| 2007/0078777 A1 | 4/2007 | Demartini et al. | |
| 2007/0269044 A1 | 11/2007 | Bruestle | |
| 2007/0288391 A1 | 12/2007 | Nakamura et al. | |

FOREIGN PATENT DOCUMENTS

| | | |
|---|---|---|
| WO | WO 00/08909 A2 | 2/2000 |
| WO | WO 00/58811 | 10/2000 |
| WO | WO 00/59150 | 10/2000 |
| WO | WO 00/68763 A1 | 11/2000 |
| WO | WO 01/44908 A1 | 6/2001 |
| WO | WO 01/46783 A2 | 6/2001 |
| WO | WO 01/52021 A1 | 7/2001 |
| WO | WO 02/01335 A2 | 1/2002 |
| WO | WO 02/23315 A2 | 3/2002 |
| WO | WO 02/37371 A1 | 5/2002 |

OTHER PUBLICATIONS

Fowler, T.B. "Technology's Changing Role in Intellectual Property Rights", *IT Professional(IEEE)*, 2002, 4(2), 39-44.

Gable, J. "The Digital Rights Conundrum", *Transform Magazine*, *2001*, 10(11), 27.

Griswold, G.N. "A Method for Protecting Copyright on Networks", *IMA Intell. Property Project Proceedings*, Jan. 1994, 1(1), 169-178.

Gunter, C.A., et al. "Models and Languages for Digital Rights", *Proceedings of the 34th Annual Hawaii International Conference on System Sciences*, 2001, 5.

Kahn, R.E. "Deposit, Registration and Recordation in an Electronic Copyright Management System", *IMA Intellectual Property Project Proceedings*, Jan. 1994, 1(1), 111-120.

Peinado, M. "Digital rights management in a multimedia environment", *SMPTE Journal*, 2002, 111(3), 159-163.

Royan, B. Content creation and rights management; experiences of SCRAN(the Scottish Cultural Resources Access Network), *Program*, 2000, 34(2), 131-142.

Valimaki, M. et al., "Digital rights management on open and semi-open networks", *WIAPP*, 2001, 154-155.

Yu, H. "Digital multimedia at home and content rights management", *IEEE, Proceedigns 2002 IEEE 4th International Workshop on Networked Appliances*, 2002, 49-56.

"Managing digital rights in online publishing", *Information Management & Technology*, 2001, 34(4), 168-169.

Hwang, C. et al., "Protection of Digital Contents on Distributed Multimedia Environment", *Proceedings of the LASTED International Conference, Internet and Multimedia Systems and Applications*, Nov. 19-23, 2000, Las Vegas, Nevada, USA, pp. 127-132.

Hong, S. et al., "On the construction of a powerful distributed authentication server without additional key management", *Computer Communications*, 2000, 23, 1638-1644.

Managing Digital Rights in Online Publishing, "How two publishing houses maintin control of copyright" *Information Management & Technology*, 2001, 34(4), 168-469.

Jakobsson, M. et al., "Proprietary Certificates", *Topics in Cryptology*, 2002, 164-181.

Kumik, P. "Digital Rights Management", *Computers and Law*, 2000, 11(4), 14-15.

Torrubia, A. et al., "Cryptography regulations for E-commerce and digital rights management", *Computers & Security*, 2001, 20(8), 724-738.

Zwollo, K. "Digital document delivery and digital rights management", *Information Services & Use*, 2001, 9-11.

Johner, H. et al., "Understanding LDAP", IBM Redbooks, Nov. 10, 1999, 153 pages, XP 002222591.

Martin, M. et al., "Federated Digital Rights Management: A Proposed DRM Solution for Research and Education", D-Lib Magazine, Corporation for National Research Initiatives, Jul. 2002, 8(7-8), 14 pages, XP 002999120.

Free On-Line Dictionary of Computing, "Concatenate", Dec. 22, 1995, 1 page.

Aumann et al., "Efficient of Nondeterministic Parallel Programs on Asynchronous System", ACM, Dec. 31, 1996, 139(1), 1-16.

Bruggemann, "Rights in an Object-Oriented Environment", Results of the IFIP WG 11.3 Workshop on Database Security V: Status and Prospects, (no month available) 1991, A-6, 99-115.

Hanai, "Latest Information and Establishment of a Server-Setting Up Free BSD", UNIX User, Softbank Publishing Co., Ltd., Japan, Mar. 1, 2002, 11(3), 93-100.

Kaplan, "IBM Cryptolopes™, SuperDistribution and Digital Rights Management", htto://www.research.ibm.com, (no month available) 1996, 1-7.

Menezes et al., "Handbook of Applied Cryptography", CRC Press, (no month available) 1997, 31-32.

Oda, "The Basics and Application of Security ID cards—Passport to an e-business", Apr. 27, 2000, 1$^{st}$ Edition, 143-144.

Schneier, "Applied Cryptography Passage", Applied Cryptography, Protocols, Algorithms, and Source Code in C, (no month available) 1996, 2$^{nd}$ Edition, 584-587.

Schneier, "Applied Cryptography", Applied Cryptography, Protocols, Algorithms and Source Code in C, (no month available) 1996, 574-577.

Schneier, "Applied Cryptography", Applied Cryptography, Protocols, Algorithms and Source Code in C, (no month available) 1996, 183-187.

U.S. Appl. No. 10/185,278: Final Rejection, Aug. 24, 2007, 17 pages.
U.S. Appl. No. 10/185,278: Final Rejection, Sep. 19, 2006, 16 pages.
U.S. Appl. No. 10/185,278: Non Final Rejection, Feb. 27, 2007, 15 pages.
U.S. Appl. No. 10/185,278: Non Final Rejection, Feb. 28, 2006, 20 pages.
U.S. Appl. No. 10/185,278: Non Final Rejection, Jan. 10, 2008, 13 pages.
U.S. Appl. No. 10/185,278: Non Final Rejection, Jul. 17, 2008, 21 pages.
U.S. Appl. No. 10/185,278: Notice of Allowance, Feb. 10, 2009, 34 pages.
U.S. Appl. No. 10/185,511: Final Rejection, Aug. 21, 2007, 22 pages.
U.S. Appl. No. 10/185,511: Final Rejection, Aug. 22, 2008, 20 pages.
U.S. Appl. No. 10/185,511: Final Rejection, Nov. 12, 2009, 38 pages.
U.S. Appl. No. 10/185,511: Final Rejection, Sep. 27, 2006, 22 pages.
U.S. Appl. No. 10/185,511: Non Final Rejection, Jan. 28, 2008, 19 pages.
U.S. Appl. No. 10/185,511: Non Final Rejection, Mar. 30, 2009, 37 pages.
U.S. Appl. No. 10/185,511: Non Final Rejection, Mar. 6, 2007, 23 pages.
U.S. Appl. No. 10/185,511: Non Final Rejection, Mar. 9, 2006, 21 pages.
U.S. Appl. No. 10/185,511: Non Final Rejection, May 11, 2010, 38 pages.
U.S. Appl. No. 10/185,527: Final Rejection, Sep. 26, 2006, 17 pages.
U.S. Appl. No. 10/185,527: Non Final Rejection, Feb. 28, 2006, 26 pages.
U.S. Appl. No. 10/185,527: Non Final Rejection, May 18, 2007, 19 pages.
U.S. Appl. No. 10/185,527: Notice of Allowance, Oct. 29, 2007, 20 pages.
U.S. Appl. No. 10/364,115: Final Rejection, Aug. 20, 2007, 13 pages.
U.S. Appl. No. 10/364,115: Final Rejection, Nov. 24, 2009, 23 pages.
U.S. Appl. No. 10/364,115: Final Rejection, Sep. 3, 2008, 16 pages.
U.S. Appl. No. 10/364,115: Non Final Rejection, Feb. 10, 2009, 18 pages.
U.S. Appl. No. 10/364,115: Non Final Rejection, Mar. 7, 2008, 14 pages.
U.S. Appl. No. 10/364,115: Non Final Rejection, Mar. 8, 2007, 10 pages.
U.S. Appl. No. 10/364,115: Non Final Rejection, Sep. 27, 2006, 17 pages.
U.S. Appl. No. 10/364,627: Final Rejection, Aug. 30, 2007, 20 pages.
U.S. Appl. No. 10/364,627: Final Rejection, Sep. 1, 2006, 18 pages.
U.S. Appl. No. 10/364,627: Non Final Rejection, Jan. 8, 2008, 21 pages.
U.S. Appl. No. 10/364,627: Non Final Rejection, May 15, 2007, 20 pages.
U.S. Appl. No. 10/364,627: Non Final Rejection, May 30, 2006, 28 pages.
U.S. Appl. No. 10/364,627: Non Final Rejection, Sep. 18, 2008, 31 pages.
U.S. Appl. No. 10/364,627: Notice of Allowance, May 11, 2009, 16 pages.
U.S. Appl. No. 10/374,324: Notice of Allowance, Aug. 15, 2005, 36 pages.

* cited by examiner

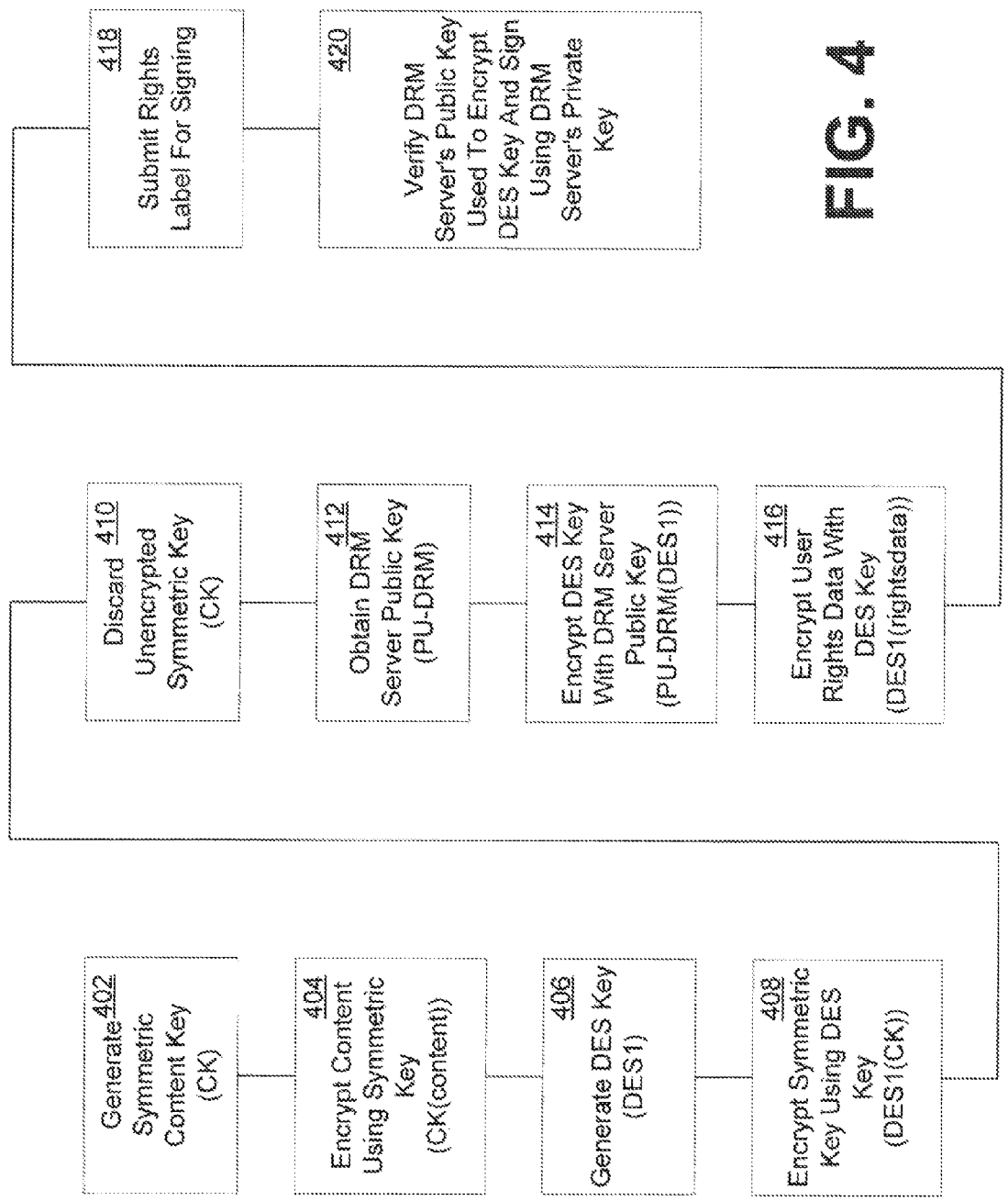

| SRL 308 | CONTENT INFO | DRM SERVER INFO | - (PU-DRM(DES1)) | - REFERRAL INFO | - - URL | - - FALL-BACK | RIGHTS LABEL INFO | (DES1(RIGHTSDATA)) | (DES1(CK)) | S (PR-DRM) |

FIG. 4A

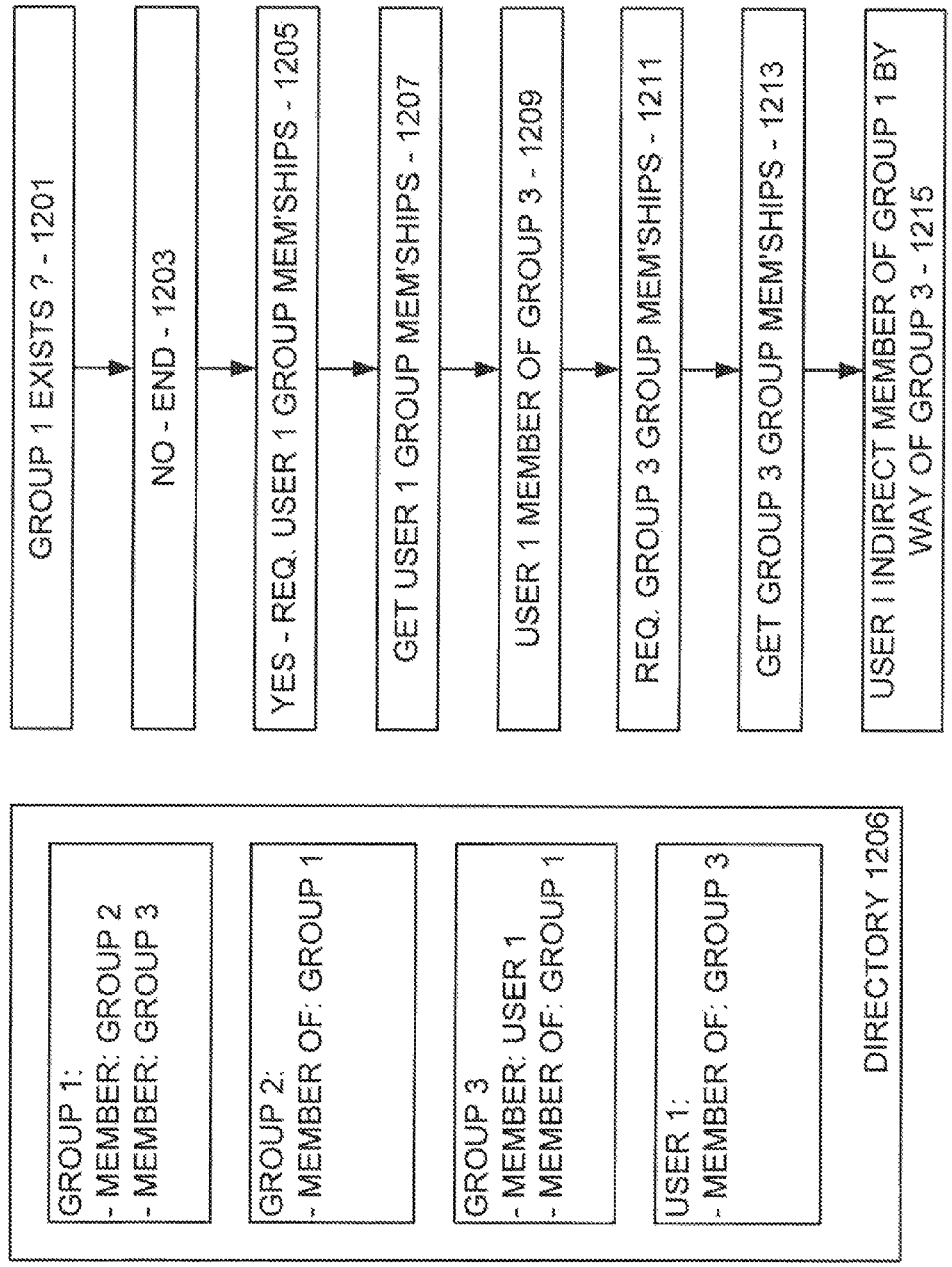

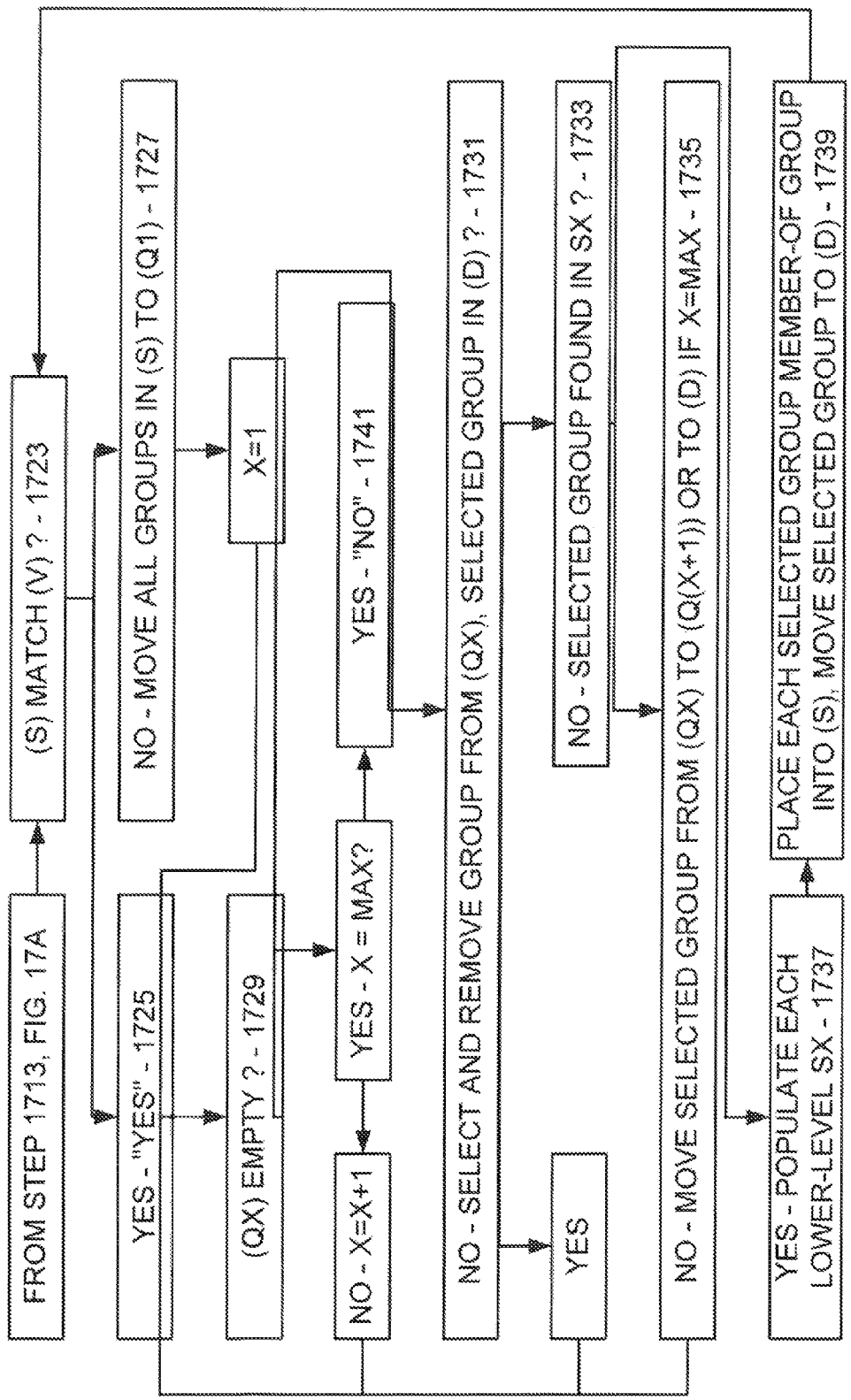

ISSUING A DIGITAL RIGHTS MANAGEMENT (DRM) LICENSE FOR CONTENT BASED ON CROSS-FOREST DIRECTORY INFORMATION

CROSS-REFERENCE TO RELATED APPLICATIONS

The following U.S. Patent Applications disclose subject matter that is related to the subject matter of the present application, and are hereby incorporated herein by reference in their entirety:

U.S. patent application Ser. No. 10/185,527, filed Jun. 28, 2002 and entitled "Obtaining a Signed Rights Label (SRL) for Digital Content and Obtaining a Digital License Corresponding to the Content Based on the SRL in a Digital Rights Management System";

U.S. patent application Ser. No. 10/185,278, filed Jun. 28, 2002 and entitled "Using a Rights Template to Obtain a Signed Rights Label (SRL) for Digital Content in a Digital Rights Management System";

U.S. patent application Ser. No. 10/185,511, filed Jun. 28, 2002 and entitled "Systems And Methods For Issuing Usage Licenses For Digital Content And Services";

U.S. patent application Ser. No 10/364,627 filed Feb. 11, 2003 and entitled "Publishing Digital Content Within an Organization in Accordance with a Digital Rights Management (DRM) System;

U.S. patent application Ser. No. 10/364,115, filed Feb. 11, 2003 and entitled "Publishing Digital Content Within an Organization in Accordance with a Digital Rights Management (DRM) System; and U.S. patent application Ser. No 10/374,324, filed Feb. 26, 2003 concurrently with the present application and entitled "Reviewing Cached User-Group information in Connection with Issuing a Digital Rights Management (DRM) License for Content".

TECHNICAL FIELD

This invention relates to a digital rights management (DRM) system. More particularly, the invention relates to employing a DRM system to publish digital content in an organization such as an office or corporation or the like such that rendering and use of the content within the organization may be constrained according to corresponding use or license terms. Even more particularly, the present invention relates to issuing a digital license for corresponding digital content based on group information obtained from a directory from another forest.

BACKGROUND OF THE INVENTION

Digital rights management and enforcement is highly desirable in connection with digital content such as digital audio, digital video, digital text, digital data, digital multimedia, etc., where such digital content is to be distributed to one or more users. Digital content could be static, such as a text document, for example, or it could be streamed, such as the streamed audio/video of a live event. Typical modes of distribution include tangible devices such as a magnetic (floppy) disk, a magnetic tape, an optical (compact) disk (CD), etc., and intangible media such as an electronic bulletin board, an electronic network, the Internet, etc. Upon being received by the user, such user renders or 'plays' the digital content with the aid of an appropriate rendering device such as a media player on a personal computer or the like.

In one scenario, a content owner or rights-owner such as an author, a publisher, a broadcaster, etc., wishes to distribute such digital content to each of many users or recipients in exchange for a license fee or some other consideration. In such scenario, then, the content may be a song, an album of songs, a movie, etc., and the purpose of the distribution is to generate the license fees. Such content owner, given the choice, would likely wish to restrict what the user can do with such distributed digital content. For example, the content owner would like to restrict the user from copying and re-distributing such content to a second user, at least in a manner that denies the content owner a license fee from such second user.

In addition, the content owner may wish to provide the user with the flexibility to purchase different types of use licenses at different license fees, while at the same time holding the user to the terms of whatever type of license is in fact purchased. For example, the content owner may wish to allow distributed digital content to be played only a limited number of times, only for a certain total time, only on a certain type of machine, only on a certain type of media player, only by a certain type of user, etc.

In another scenario, a content developer, such as an employee in or member of an organization, wishes to distribute such digital content to one or more other employees or members in the organization or to other individuals outside the organization, but would like to keep others from rendering the content. Here, the distribution of the content is more akin to organization-based content sharing in a confidential or restricted manner, as opposed to broad-based distribution in exchange for a license fee or some other consideration.

In such scenario, then, the content may be a document presentation, spreadsheet, database, email, or the like, such as may be exchanged within an office setting, and the content developer may wish to ensure that the content stays within the organization or office setting and is not rendered by non-authorized individuals, such as for example competitors or adversaries. Again, such content developer wishes to restrict what a recipient can do with such distributed digital content. For example, the content owner would like to restrict the user from copying and re-distributing such content to a second user, at least in a manner that exposes the content outside the bounds of individuals who should be allowed to render the content.

In addition, the content developer may wish to provide various recipients with different levels of rendering rights. For example, the content developer may wish to allow protected digital content to be viewable and not printable with respect to one class of individual, and viewable and printable with respect to another class of individual.

However, and in either scenario, after distribution has occurred, such content owner/developer has very little if any control over the digital content. This is especially problematic in view of the fact that practically every personal computer includes the software and hardware necessary to make an exact digital copy of such digital content, and to download such exact digital copy to a write-able magnetic or optical disk, or to send such exact digital copy over a network such as the Internet to any destination.

Of course, as part of a transaction wherein the content is distributed, the content owner/developer may require the user/recipient of the digital content to promise not to re-distribute such digital content in an unwelcome manner. However, such a promise is easily made and easily broken. A content owner/developer may attempt to prevent such re-distribution through any of several known security devices, usually involving encryption and decryption. However, there is likely very little that prevents a mildly determined user from decrypting encrypted digital content, saving such digital content in an un-encrypted form, and then re-distributing same.

A need exists, then, for providing a digital rights management (DRM) and enforcement architecture and method that allows the controlled rendering or playing of arbitrary forms of digital content, where such control is flexible and definable by the content owner/developer of such digital content. More specifically, a need exists for such an architecture that allows and facilitates such controlled rendering, especially in an office or organization environment or the like where documents are to be shared amongst a defined group of individuals or classes of individuals. Even more specifically, a need exists for such an architecture that allows content to be licensed across pre-defined divisions or 'forests' within the organization.

SUMMARY OF THE INVENTION

The aforementioned needs are satisfied at least in part by the present invention in which it is determined whether a user from an organization is a member of a group pre-defined within the organization, where the organization maintains a computer network comprising at least a forest A and a forest B, where forest A has a directory A and a querying entity A capable of querying directory A, and where forest B has a directory B and a querying entity B capable of querying directory B.

In the method, querying entity A receives a request from the user and decides whether to grant the request based at least in part on whether the user is a member of the group. Thus, querying entity A queries directory A of forest A to return information on the group and in response is directed to forest B. Querying entity A therefore contacts querying entity B of forest B and requests querying entity B to query directory B whether the user is a member of the group. Querying entity A receives in response from querying entity B whether the user is in fact a member of the group, and grants the request from the user based at least in part on whether the user is a member of the group.

BRIEF DESCRIPTION OF THE DRAWINGS

The foregoing summary, as well as the following detailed description of the embodiments of the present invention, will be better understood when read in conjunction with the appended drawings. For the purpose of illustrating the invention, there are shown in the drawings embodiments which are presently preferred. As should be understood, however, the invention is not limited to the precise arrangements and instrumentalities shown. In the drawings:

FIG. 4 is a flowchart of a preferred embodiment of a method according to the invention for publishing rights managed digital content;

FIG. 4A is a block diagram showing the structure of a signed rights label as produced by the method of FIG. 4;

FIG. 10 is a block diagram showing directory entries in a directory of FIG. 8 for the entities shown in FIG. 9;

FIG. 12 is a flow diagram showing key steps performed by a DRM server of FIG. 8 when determining whether a user is a member of a group that is native to the forest of the DRM server;

FIGS. 17A and 17B are flow charts showing key steps performed by an algorithm employed by a licensing DRM server of FIG. 8 in connection with the cache architectures of FIGS. 15 and 16 to determine whether a user is a member of a group in accordance with one embodiment of the present invention.

DETAILED DESCRIPTION OF THE INVENTION
COMPUTER ENVIRONMENT

Figure 1:
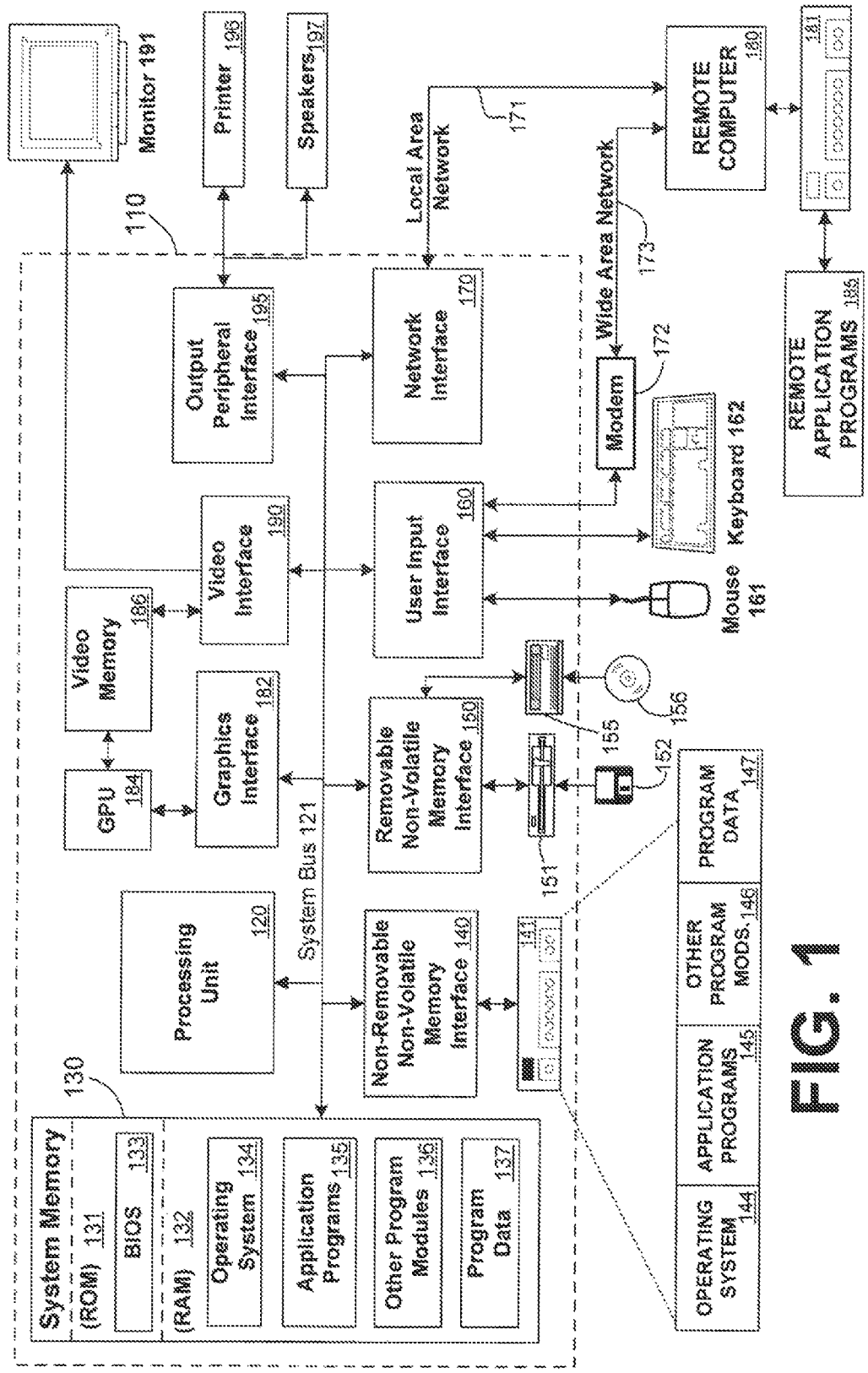
FIG. 1 is a block diagram representing an exemplary non-limiting computing environment in which the present invention may be implemented.

FIG. 1 and the following discussion are intended to provide a brief general description of a suitable computing environment in which the invention may be implemented. It should be understood, however, that handheld, portable, and other computing devices of all kinds are contemplated for use in connection with the present invention. While a general purpose computer is described below, this is but one example, and the present invention requires only a thin client having network server interoperability and interaction. Thus, the present invention may be implemented in an environment of networked hosted services in which very little or minimal client resources are implicated, e.g., a networked environment in which the client device serves merely as a browser or interface to the World Wide Web.

Although not required, the invention can be implemented via an application programming interface (API), for use by a developer, and/or included within the network browsing software which will be described in the general context of computer-executable instructions, such as program modules, being executed by one or more computers, such as client workstations, servers, or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer system configurations. Other well known computing systems, environments, and/or configurations that may be suitable for use with the invention include, but are not limited to, personal computers (PCs), automated teller machines, server computers, hand-held or laptop devices, multi-processor systems, microprocessor-based systems, programmable consumer electronics, network PCs, minicomputers, mainframe computers, and the like. The invention may also be practiced in distributed computing environments where tasks are performed by remote processing devices that are linked through a communications network or other data transmission medium. In a distributed computing environment, program modules may be located in both local and remote computer storage media including memory storage devices.

FIG. 1 thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1 provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB).

A monitor 191 or other type of display device is also connected to the system bus 121 via an interface, such as a video interface 190. A graphics interface 182, such as Northbridge, may also be connected to the system bus 121. Northbridge is a chipset that communicates with the CPU, or host processing unit 120, and assumes responsibility for accelerated graphics port (AGP) communications. One or more graphics processing units (GPUS) 184 may communicate with graphics interface 182. In this regard, GPUs 184 generally include on-chip memory storage, such as register storage and GPUs 184 communicate with a video memory 186. GPUs 184, however, are but one example of a coprocessor and thus a variety of co-processing devices may be included in computer 110. A monitor 191 or other type of display device is also connected to the system bus 121 via an interface, such as a video interface 190, which may in turn communicate with video memory 186. In addition to monitor 191, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

One of ordinary skill in the art can appreciate that a computer 110 or other client device can be deployed as part of a computer network. In this regard, the present invention pertains to any computer system having any number of memory or storage units, and any number of applications and processes occurring across any number of storage units or volumes. The present invention may apply to an environment with server computers and client computers deployed in a network environment, having remote or local storage. The present invention may also apply to a standalone computing device, having programming language functionality, interpretation and execution capabilities.

Distributed computing facilitates sharing of computer resources and services by direct exchange between computing devices and systems. These resources and services include the exchange of information, cache storage, and disk storage for files. Distributed computing takes advantage of network connectivity, allowing clients to leverage their collective power to benefit the entire enterprise. In this regard, a variety of devices may have applications, objects or resources that may interact to implicate authentication techniques of the present invention for trusted graphics pipeline(s).

Figure 2:
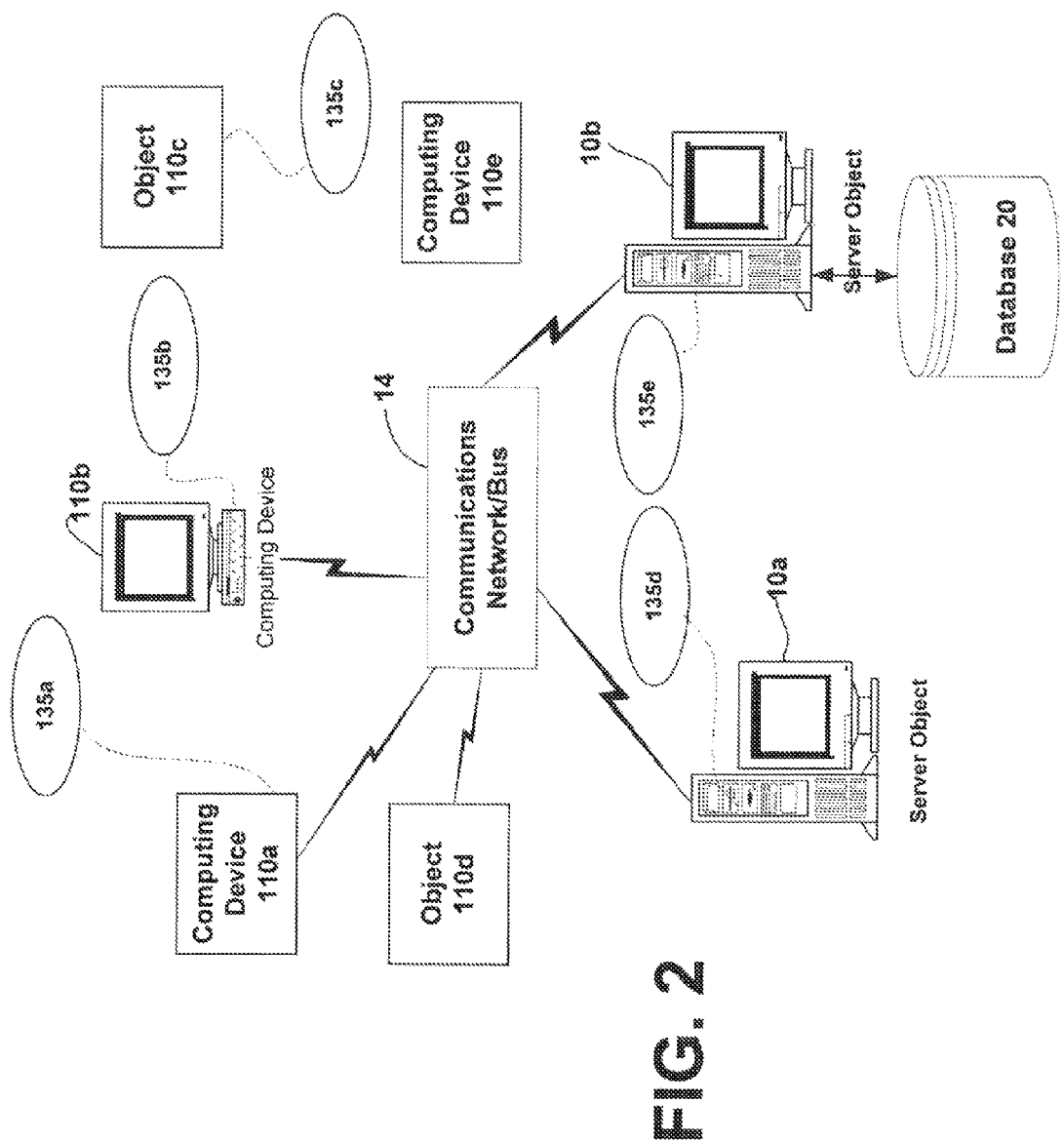
FIG. 2 is a block diagram representing an exemplary network environment having a variety of computing devices in which the present invention may be implemented.

FIG. 2 provides a schematic diagram of an exemplary networked or distributed computing environment. The distributed computing environment comprises computing objects 10*a*, 10*b*, etc. and computing objects or devices 110*a*, 110*b*, 110*c*, etc. These objects may comprise programs, methods, data stores, programmable logic, etc. The objects may comprise portions of the same or different devices such as PDAs, televisions, MP3 players, televisions, personal computers, etc. Each object can communicate with another object by way of the communications network 14. This network may itself comprise other computing objects and computing devices that provide services to the system of FIG. 2. In accordance with an aspect of the invention, each object 10 or 110 may contain an application that might request the authentication techniques of the present invention for trusted graphics pipeline(s).

It can also be appreciated that an object, such as 110*c*, may be hosted on another computing device 10 or 110. Thus, although the physical environment depicted may show the connected devices as computers, such illustration is merely exemplary and the physical environment may alternatively be depicted or described comprising various digital devices such as PDAs, televisions, MP3 players, etc., software objects such as interfaces, COM objects and the like.

There are a variety of systems, components, and network configurations that support distributed computing environments. For example, computing systems may be connected together by wireline or wireless systems, by local networks or widely distributed networks. Currently, many of the networks are coupled to the Internet, which provides the infrastructure for widely distributed computing and encompasses many different networks.

In home networking environments, there are at least four disparate network transport media that may each support a unique protocol such as Power line, data (both wireless and wired), voice (e.g., telephone) and entertainment media. Most home control devices such as light switches and appliances may use power line for connectivity. Data Services may enter the home as broadband (e.g., either DSL or Cable modem) and are accessible within the home using either wireless (e.g., HomeRF or 802.11b) or wired (e.g., Home PNA, Cat 5, even power line) connectivity. Voice traffic may enter the home either as wired (e.g., Cat 3) or wireless (e.g., cell phones) and may be distributed within the home using Cat 3 wiring. Entertainment media may enter the home either through satellite or cable and is typically distributed in the home using coaxial cable. IEEE 1394 and DVI are also emerging as digital interconnects for clusters of media devices. All of these network environments and others that may emerge as protocol standards may be interconnected to form an intranet that may be connected to the outside world by way of the Internet. In short, a variety of disparate sources exist for the storage and transmission of data, and consequently, moving forward, computing devices will require ways of protecting content at all portions of the data processing pipeline.

The 'Internet' commonly refers to the collection of networks and gateways that utilize the TCP/IP suite of protocols, which are well-known in the art of computer networking. TCP/IP is an acronym for "Transport Control Protocol/Interface Program." The Internet can be described as a system of geographically distributed remote computer networks interconnected by computers executing networking protocols that allow users to interact and share information over the networks. Because of such wide-spread information sharing, remote networks such as the Internet have thus far generally evolved into an open system for which developers can design software applications for performing specialized operations or services, essentially without restriction.

Thus, the network infrastructure enables a host of network topologies such as client/server, peer-to-peer, or hybrid architectures. The "client" is a member of a class or group that uses the services of another class or group to which it is not related. Thus, in computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer e.g., a server. In the example of FIG. 2, computers 110a, 110b, etc. can be thought of as clients and computer 10a, 10b, etc. can be thought of as the server where server 10a, 10b, etc. maintains the data that is then replicated in the client computers 110a, 110b, etc.

A server is typically a remote computer system accessible over a remote network such as the Internet. The client process may be active in a first computer system, and the server process may be active in a second computer system, communicating with one another over a communications medium, thus providing distributed functionality and allowing multiple clients to take advantage of the information-gathering capabilities of the server.

Client and server communicate with one another utilizing the functionality provided by a protocol layer. For example, Hypertext-Transfer Protocol (HTTP) is a common protocol that is used in conjunction with the World Wide Web (WWW). Typically, a computer network address such as a Universal Resource Locator (URL) or an Internet Protocol (IP) address is used to identify the server or client computers to each other. The network address can be referred to as a Universal Resource Locator address. For example, communication can be provided over a communications medium. In particular, the client and server may be coupled to one another via TCP/IP connections for high-capacity communication.

Thus, FIG. 2 illustrates an exemplary networked or distributed environment, with a server in communication with client computers via a network/bus, in which the present invention may be employed. In more detail, a number of servers 10a, 10b, etc., are interconnected via a communications network/bus 14, which may be a LAN, WAN, intranet, the Internet, etc., with a number of client or remote computing devices 110a, 110b, 110c, 110d, 110e, etc., such as a portable computer, handheld computer, thin client, networked appliance, or other device, such as a VCR, TV, oven, light, heater and the like in accordance with the present invention. It is thus contemplated that the present invention may apply to any computing device in connection with which it is desirable to process, store or render secure content from a trusted source.

In a network environment in which the communications network/bus 14 is the Internet, for example, the servers 10 can be Web servers with which the clients 110a, 110b, 110c, 110d, 110e, etc. communicate via any of a number of known protocols such as HTTP. Servers 10 may also serve as clients 110, as may be characteristic of a distributed computing environment. Communications may be wired or wireless, where appropriate. Client devices 110 may or may not communicate via communications network/bus 14, and may have independent communications associated therewith. For example, in the case of a TV or VCR, there may or may not be a networked aspect to the control thereof. Each client computer 110 and server computer 10 may be equipped with various application program modules or objects (135 a, b, c, d, e) and with connections or access to various types of storage elements or objects, across which files may be stored or to which portion(s) of files may be downloaded or migrated. Thus, the present invention can be utilized in a computer network environment having client computers 110a, 110b, etc. that can access and interact with a computer network/bus 14 and server computers 10a, 10b, etc. that may interact with client computers 110a, 110b, etc. and other devices 111 and databases 20.

Digital Rights Management (DRM) Overview

Figure 11:
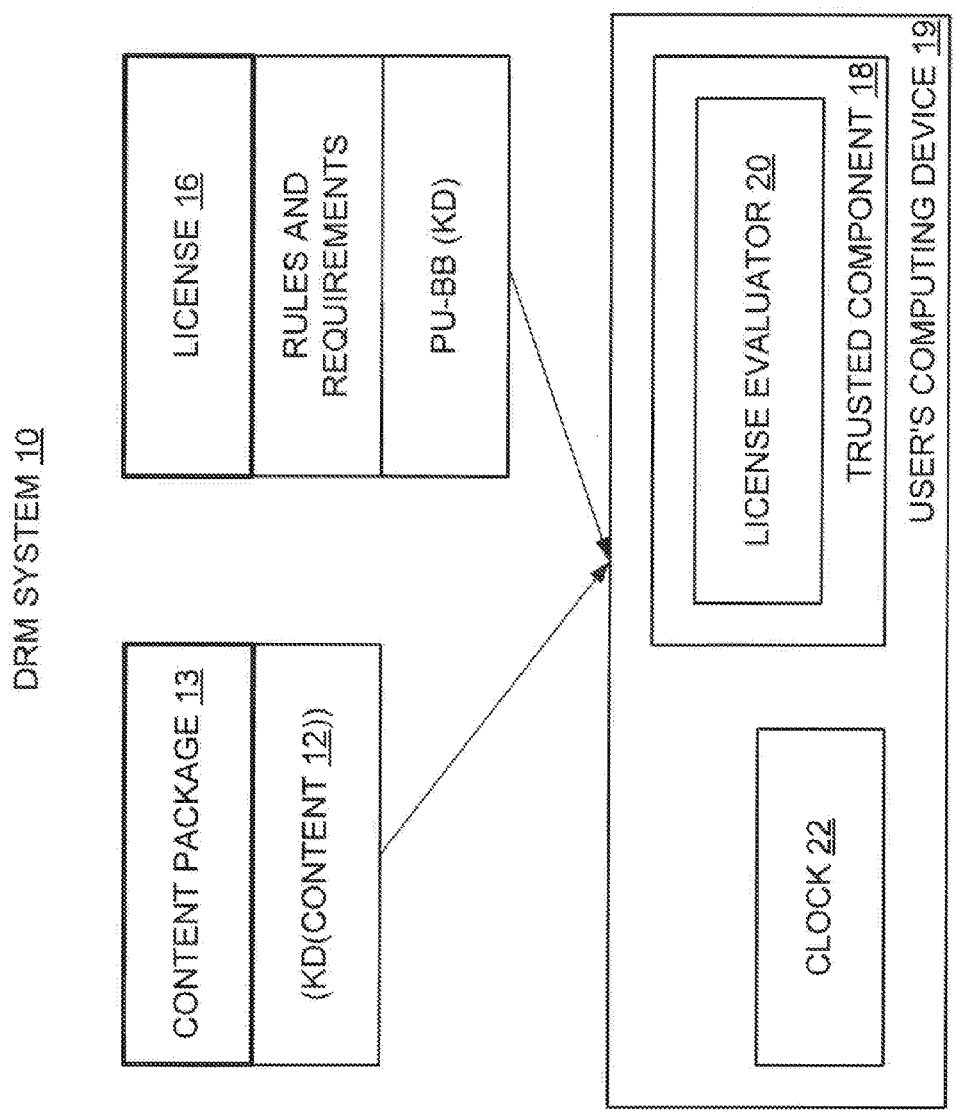
FIG. 11 is a block diagram showing an enforcement architecture of an example of a trust-based system.

As is known and referring now to FIG. 11, digital rights management (DRM) and enforcement is highly desirable in connection with digital content 12 such as digital audio, digital video, digital text, digital data, digital multimedia, etc., where such digital content 12 is to be distributed to users. Upon being received by the user, such user renders or 'plays' the digital content with the aid of an appropriate rendering device such as a media player on a personal computer 19 or the like that may have a clock 22, a trusted component 18, and a license evaluator 20.

Typically, a content owner or developer (hereinafter 'owner') distributing such digital content 12 wishes to restrict what the user can do with such distributed digital content 12. For example, the content owner may wish to restrict the user from copying and re-distributing such content 12 to a second user, or may wish to allow distributed digital content 12 to be played only a limited number of times, only for a certain total time, only on a certain type of machine, only on a certain type of media player, only by a certain type of user, etc.

However, after distribution has occurred, such content owner has very little if any control over the digital content 12. A DRM system 10, then, allows the controlled rendering or playing of arbitrary forms of digital content 12, where such control is flexible and definable by the content owner of such digital content. Typically, content 12 is distributed to the user in the form of a package 13 by way of any appropriate distribution channel. The digital content package 13 as distributed may include the digital content 12 encrypted with a symmetric encryption/decryption key (KD), (i.e., (KD(CONTENT))), as well as other information identifying the content, how to acquire a license for such content, etc.

The trust-based DRM system 10 allows an owner of digital content 12 to specify license rules that must be satisfied before such digital content 12 is allowed to be rendered on a user's computing device 14. Such license rules can include the aforementioned temporal requirement, and may be embodied within a digital license or use document (hereinafter 'license') 16 that the user/user's computing device 14 (hereinafter, such terms are interchangeable unless circumstances require otherwise) must obtain from the content owner or an agent thereof. Such license 16 also includes the decryption key (KD) for decrypting the digital content, perhaps encrypted according to a key decryptable by the user's computing device.

The content owner for a piece of digital content 12 must trust that the user's computing device 14 will abide by the rules and requirements specified by such content owner in the license 16, i.e. that the digital content 12 will not be rendered unless the rules and requirements within the license 16 are satisfied. Preferably, then, the user's computing device 14 is provided with a trusted component or mechanism 18 that will not render the digital content 12 except according to the license rules embodied in the license 16 associated with the digital content 12 and obtained by the user.

The trusted component 18 typically has a license evaluator 20 that determines whether the license 16 is valid, reviews the license rules and requirements in such valid license 16, and determines based on the reviewed license rules and requirements whether the requesting user has the right to render the requested digital content 12 in the manner sought, among other things. As should be understood, the license evaluator 20 is trusted in the DRM system 10 to carry out the wishes of the owner of the digital content 12 according to the rules and requirements in the license 16, and the user should not be able to easily alter such trusted element for any purpose, nefarious or otherwise.

As should be understood, the rules and requirements in the license 16 can specify whether the user has rights to render the digital content 12 based on any of several factors, including who the user is, where the user is located, what type of computing device the user is using, what rendering application is calling the DRM system, the date, the time, etc. In addition, the rules and requirements of the license 16 may limit the license 16 to a pre-determined number of plays, or pre-determined play time, for example.

The rules and requirements may be specified in the license 16 according to any appropriate language and syntax. For example, the language may simply specify attributes and values that must be satisfied (DATE must be later than X, e.g.), or may require the performance of functions according to a specified script (IF DATE greater than X, THEN DO . . . , e.g.).

Upon the license evaluator 20 determining that the license 16 is valid and that the user satisfies the rules and requirements therein, the digital content 12 can then be rendered. In particular, to render the content 12, the decryption key (KD) is obtained from the license 12 and is applied to (KD(CONTENT)) from the content package 13 to result in the actual content 12, and the actual content 12 is then in fact rendered.

Publishing Digital Content

Figure 3:
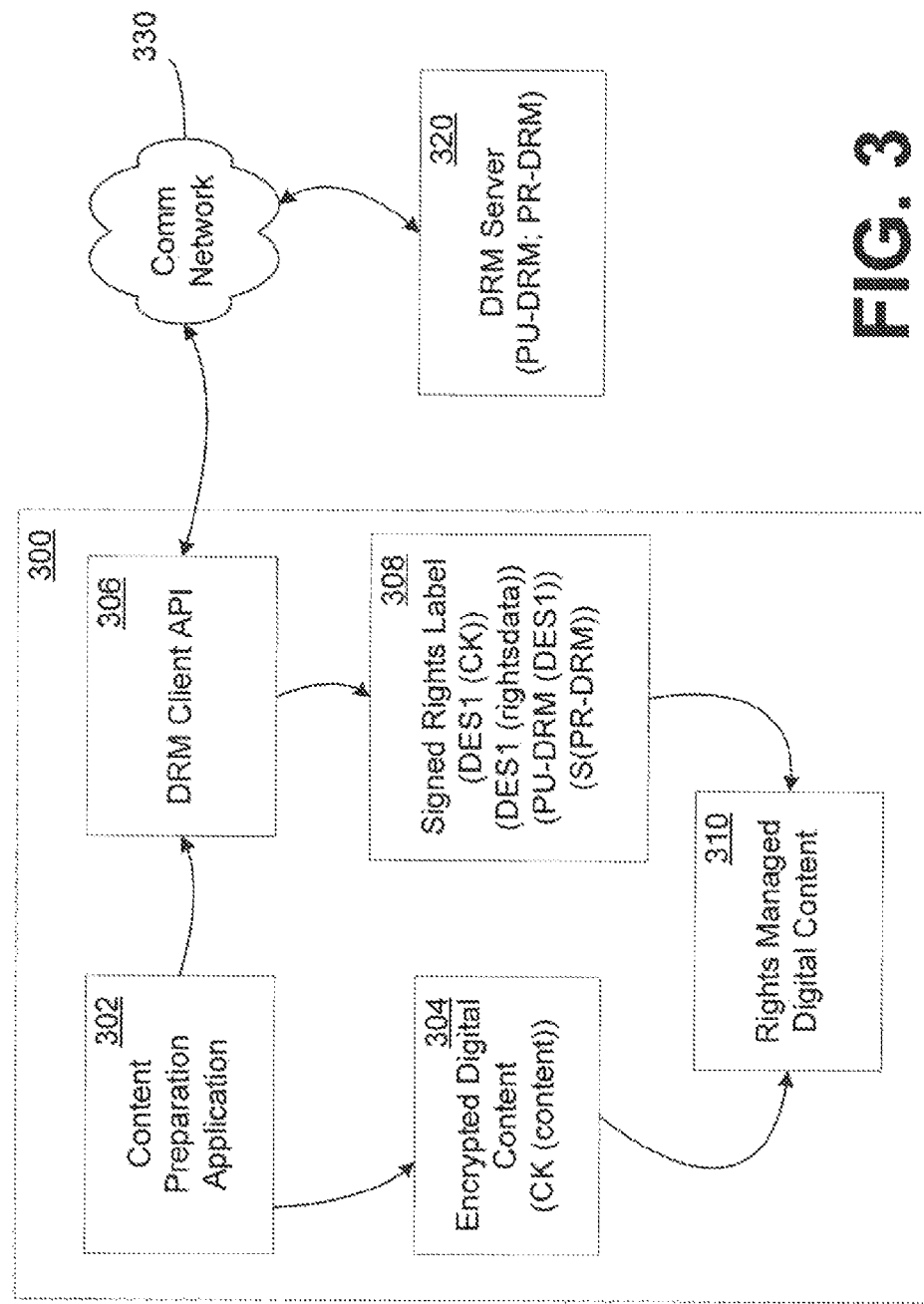
FIG. 3 is a functional block diagram of a preferred embodiment of a system and method according to the invention for publishing digital content.

FIG. 3 is a functional block diagram of a system and method for publishing digital content. "Publishing," as that term is used herein, refers to a process that an application or service follows to establish with a trusted entity a set of rights and conditions that the entity can issue for that content, as well as to whom those rights and conditions can be issued. According to the invention, the publishing process includes encrypting the digital content and associating a list of persistent enforceable rights that the author of the content intended for all possible users of the content. This process can be carried out in a secure way to prohibit access to any of the rights or to the content unless intended by the author of the content.

Three entities in particular are employed to publish secure digital content: a content preparation application 302 that executes on the client 300 and prepares the content for publishing, a digital rights management (DRM) applications program interface (API) 306 that also resides on the client device 300, and a DRM server 320 that is communicatively coupled to the client 300 via a communication network 330 such as the Internet, a local or wide area network, or a combination thereof.

The content preparation application 302 can be any application that produces digital content. For example, the application 302 can be a word processor or other publisher that produces digital text files, digital music, video, or other such content. The content could also include streamed content, such as streamed audio/video of a live or taped event, or example. The application 302 is provided with a cryptographic key to encrypt the digital content, thus forming an encrypted digital content file 304, and the user provides rights data to be tightly associated with the encrypted content in the digital content file 304. The rights data includes an identity for each entity that has rights in the digital content, and a set of rights and conditions for each identified entity.

Such an entity can be, for example, an individual, a class of individuals, or a device. Such rights can include the right to read, edit, copy, print, etc, the digital content. Conditions may include minimum system requirements, date and time limitations, play counts, and the like.

The client API 306 passes the encrypted digital content and the rights data to the DRM server 320. Using a process that is described in detail below, the DRM server 320 determines whether it can enforce the rights data and if so the DRM server 320 signs the rights data to form a signed rights label (SRL) 308. In general, however, any trusted entity can sign the rights data, preferably using a key trusted by the DRM server 320. For example, a client can sign the rights data using a key provided to it by the DRM server 320.

The rights label 308 can include data representing the rights description, the encrypted content key, and the digital signature over the rights description and the encrypted content key. If the DRM server 320 is signing the right label, it passes the signed rights label 308 back to the client through the client API 306, which stores the signed rights label 308 on the client device 300. The content preparation application 302 then associates the signed rights label 308 with the encrypted digital content file 304, such as for example by concatenation to form a rights managed content file 310. Note, though, that the SRL 308 could be stored in a known location separate from the content file 304 with a reference to the SRL 308 concatenated to the content file 304 to form the content file 310.

Referring now to FIG. 4, one method for publishing rights managed digital content is shown. At step 402, the application 302 generates a content key (CK) that is used to encrypt the digital content. The content key (CK) is typically a symmetric key although any key can be used to encrypt the digital content. As is known, a symmetric key is employed by a symmetric key algorithm both to encrypt and decrypt. Accordingly, (CK) should be well-hidden when shared between a sender and a receiver.

At step 404, the application 302 encrypts the digital content with (CK) to form encrypted digital content 304 (i.e., (CK (content))). Additionally, rights data corresponding to (CK (content)) is generated, either by the publisher of the content or by another entity. Note that such rights data may be custom rights data or rights data as obtained from a pre-defined template. As was discussed above, the rights data can include a list of entities that will be entitled to consume the content, the specific rights that each of the entities possesses with respect to the content, and any conditions that may be imposed on those rights.

At step 406, the API 306 generates a second encryption key (DES1), which is used to encrypt the content key (CK). Preferably, (DES1) is also a symmetric key. At step 408, the API 306 encrypts (CK) with (DES1) to result in (DES1 (CK)). At step 410, the API 306 discards (CK), with the result being that (CK) can now be obtained only by decrypting (DES1(CK)). To ensure that (CK(content)) is protected to a central DRM server 320 and that all "license requests" for the content are done centrally in accordance with the rights data, the API 306, at step 412, contacts the provided DRM server 320 and retrieves the public key (PU-DRM) thereof. At step 414, the API 306 encrypts (DES1) with (PU-DRM) to result in (PU-DRM (DES1)). Thus, (CK) can be protected to (PU-DRM)) to ensure that the DRM server 320 is the only entity that will be able to get access to (CK), as is required to decrypt (CK (content)). At step 416, the API 306 encrypts the rights data (i.e., the list of authorized entities and the respective rights and conditions associated with each authorized entities in the list) with (DES1) to result in (DES 1 (rightsdata)).

In an alternative embodiment, (CK) can be used to directly encrypt the rights data to result in (CK(rightsdata)), and (PU-DRM) can be used to directly encrypt (CK) to result in (PU-DRM(CK)), thereby foregoing the use of (DES1) completely. However, using (DES1) to encrypt the rights data and (CK) allows such (DES1) to conform to any particular algorithm that might be amenable to the DRM server, whereas (CK) might be specified by an entity independent from the DRM server and might not be as amenable thereto.

At step 418, the content protection application 302 submits (PU-DRM(DES1)) and (DES1(rightsdata)) to the DRM server 320 as a rights label for signing. Alternatively, the client itself can sign the rights data in the manner set forth below. If the rights data is being submitted to the server for signing, then, at step 420, the DRM server 320 accesses the rights data and verifies that it can enforce the rights and conditions in the submitted rights label. To verify that it can enforce the rights data, the DRM server 320 applies the private key (PR-DRM) corresponding to (PU-DRM) to (PU-DRM(DES1)) to result in (DES1), and then applies (DES1) to (DES1(rightsdata)) to result in the rights data in the clear. The server 320 can then do any policy checks to verify that the users, rights, and conditions specified in the rights data are within any policy enforced by the server 320. The server 320 signs the originally submitted rights label including (PU-DRM(DES1)) and (DES1(rightsdata)) to result in the signed rights label (SRL) 308, where the signature is based on the private key of the DRM server 320 (PR-DRM), and returns the SRL 308 back to the API 306, which then presents the returned SRL 308 to the client application 302.

The SRL 308 is a digitally signed document, which makes it tamper-resistant. Additionally, the SRL 308 is independent of the actual key type and algorithm used to encrypt the content but maintains the strong 1-1 relation to the content it is protecting. Referring now to FIG. 4A, in one embodiment of the present invention, the SRL 308 may include information on the content that is the basis of the SRL 308, including perhaps an ID of the content; information on the DRM server that signs the SRL 308, including (PU-DRM(DES1)) and referral information such as a URL for locating the DRM server on a network and fall-back information if the URL fails; information describing the SRL 308 itself; (DES1 (rightsdata)): (DES1(CK)); and a digital signature (S (PR-DRM)), among other things.

By ensuring that a trusted entity signs the rights data to create a signed rights label 308, the DRM server 320 is asserting that it will issue licenses for the content in accordance with the terms set forth by the publisher as described in the rights data of the rights label 308. As should be appreciated, a user is required to obtain a license to render the content, especially inasmuch as the license contains the content key (CK). When a user wants to obtain a license for the encrypted content, the user can present a license request including the SRL 308 for the content and a certificate verifying the user's credentials to the DRM server 320 or other license issuing entity. The license issuing entity can then decrypt (PU-DRM(DES1)) and (DES1 (rightsdata)) to produce the rights data, list all the rights granted by the author (if any) to the license requesting entity, and construct a license with only those specific rights.

As set forth above, upon the application 302 receiving the SRL 308, such application 302 concatenates the signed rights label 308 with the corresponding (CK(content)) 304 to form rights managed digital content. Alternatively, the rights data is stored in a known location, with a reference to that location provided with the encrypted digital content. Thus, a rendering application that is DRM-enabled can discover the signed rights label 308 via the piece of content the rendering application is attempting to render. This discovery triggers the rendering application to initiate a license request against the DRM licensing server 320. Publishing application 302 can store a URL to the DRM licensing server 320, for example, or the DRM licensing server 320 can embed its own URL as a piece of metadata into the rights label before digitally signing it, so that the DRM client API 306 called by the rendering application can identify the correct DRM licensing server 320.

Obtaining a License for the Published Content

Figure 5:
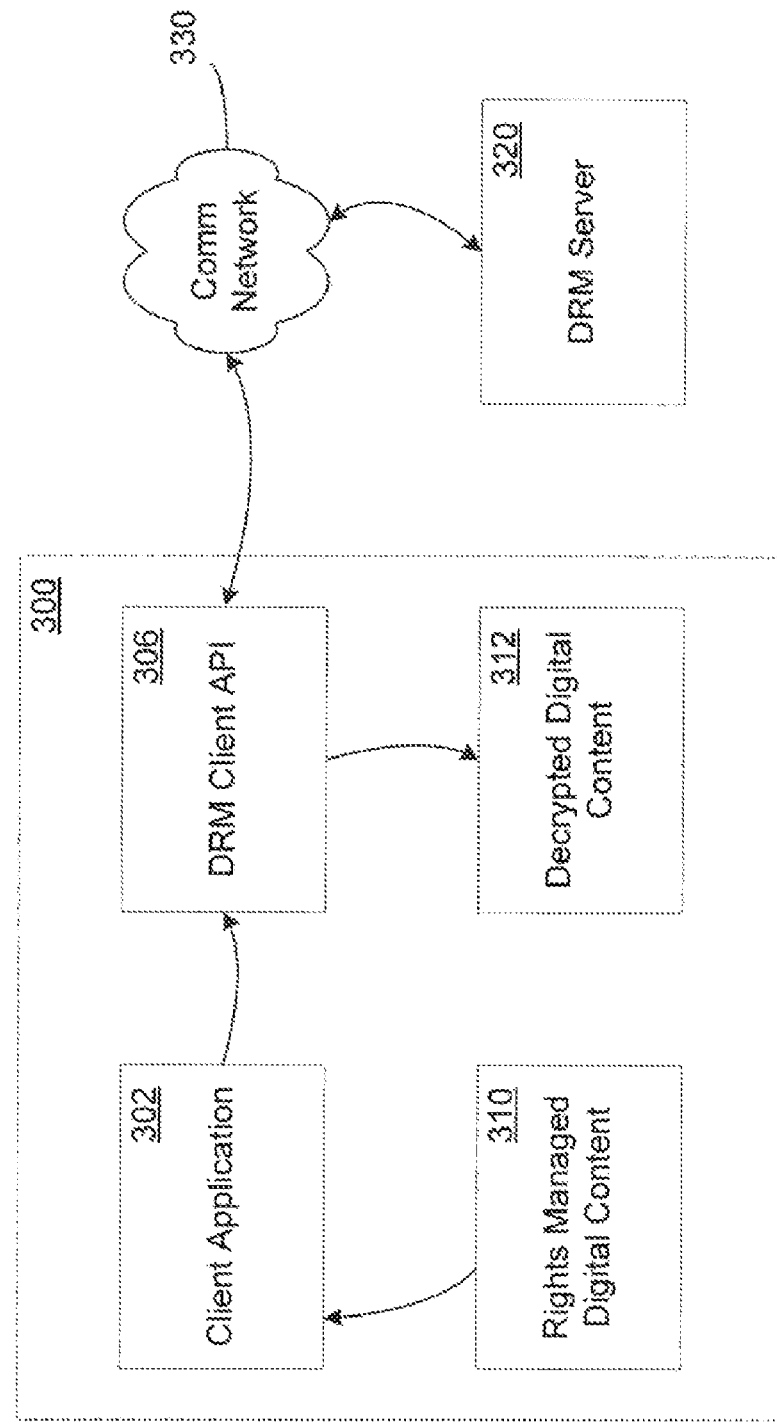
FIG. 5 is a block diagram of a preferred embodiment of a system and method according to the invention for licensing rights managed digital content.

Referring now to FIG. 5, a system and method for licensing rights managed digital content is shown. "Licensing," as that term is used herein, refers to a process that an application or service follows to request and receive a license that will enable an entity named in the license to consume the content in accordance with the terms specified in the license. Inputs to the licensing process can include the signed rights label (SRL) 308 associated with the content for which a license is being requested, and the public key certificate(s) of the entity(s) for which the license is being requested. Note that the entity requesting a license need not necessarily be the entity for which the license is being requested. Typically, a license includes the rights description from the SRL 308, an encrypted key that can decrypt the encrypted content, and a digital signature over the rights description and the encrypted key to assert legitimacy and prevent tampering.

Preliminarily, the client API 306 forwards the signed rights label 308 of the rights managed content 310 to the DRM server 320 via the communication network 330. As described above, the rights label 308 contains the content key (CK) encrypted according to the public key of the DRM server 320 (PU-DRM) (i.e., (PU-DRM(CK))). In the process of issuing a license, then, the DRM server 320 applies (PR-DRM) to (PU-DRM(CK)) to obtain (CK). It then uses the public key (PU-ENTITY) in the public key certificate that is passed up in the license request to re-encrypt (CK) (i.e., (PU-ENTITY (CK))). The newly encrypted (PU-ENTITY(CK)) is then placed into the license. Thus, the license can be returned to the caller without risk of exposing (CK), since only the holder of the private key (PR-ENTITY) corresponding to (PU-ENTITY) can recover (CK) from (PU-ENTITY(CK)). The client API 306 then uses (CK) to decrypt the encrypted content to form decrypted digital content 312. The client application 302 can then use the decrypted digital content 312 according to the rights that are provided in the license.

Alternatively, and as set forth below in more detail, a client such as the publishing client can for example issue a use license to itself to consume the content.

Figure 6A:
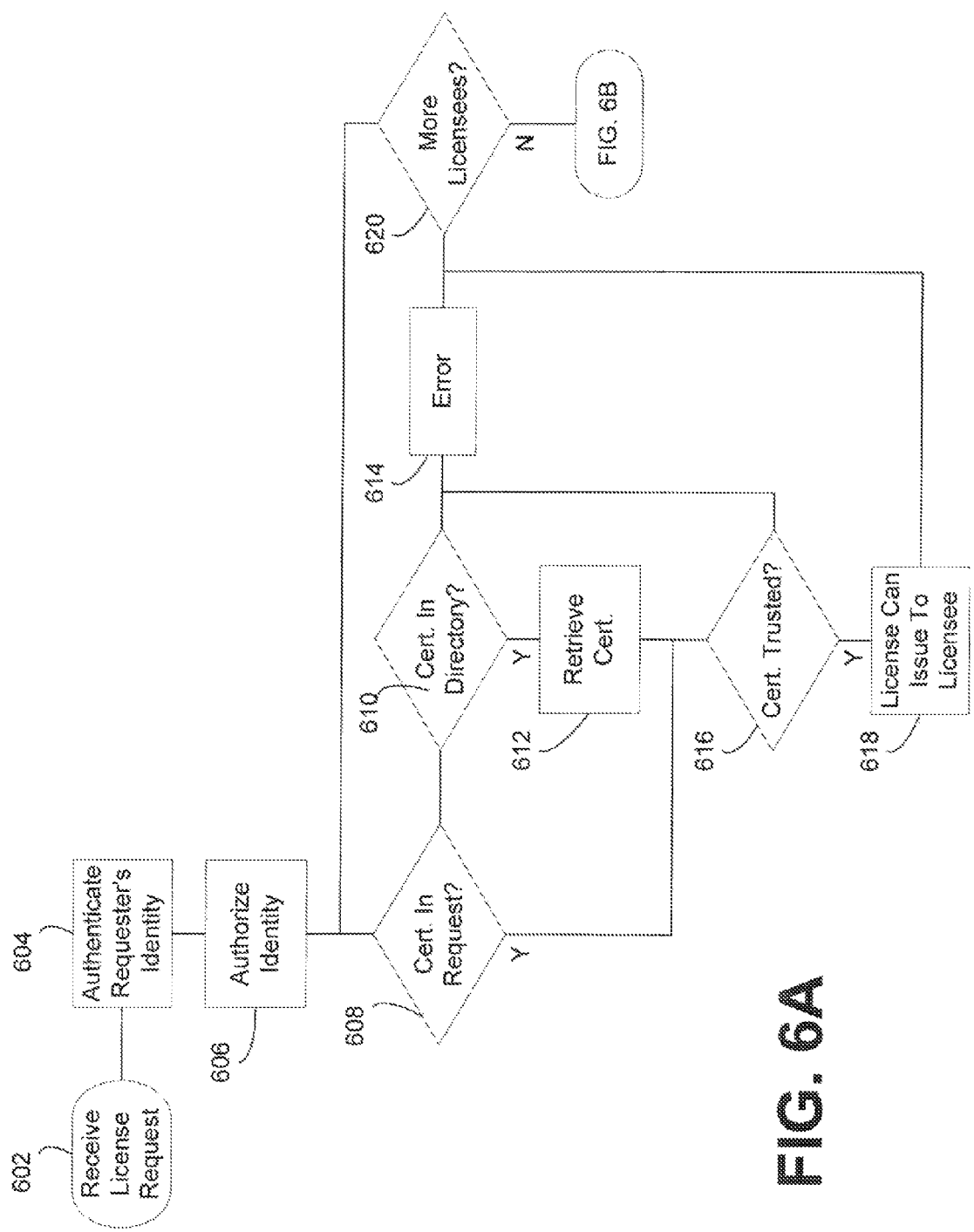
FIGS. 6A and 6B are flowcharts of a preferred embodiment of a method according to the invention for licensing rights managed digital content.
Figure 6B:
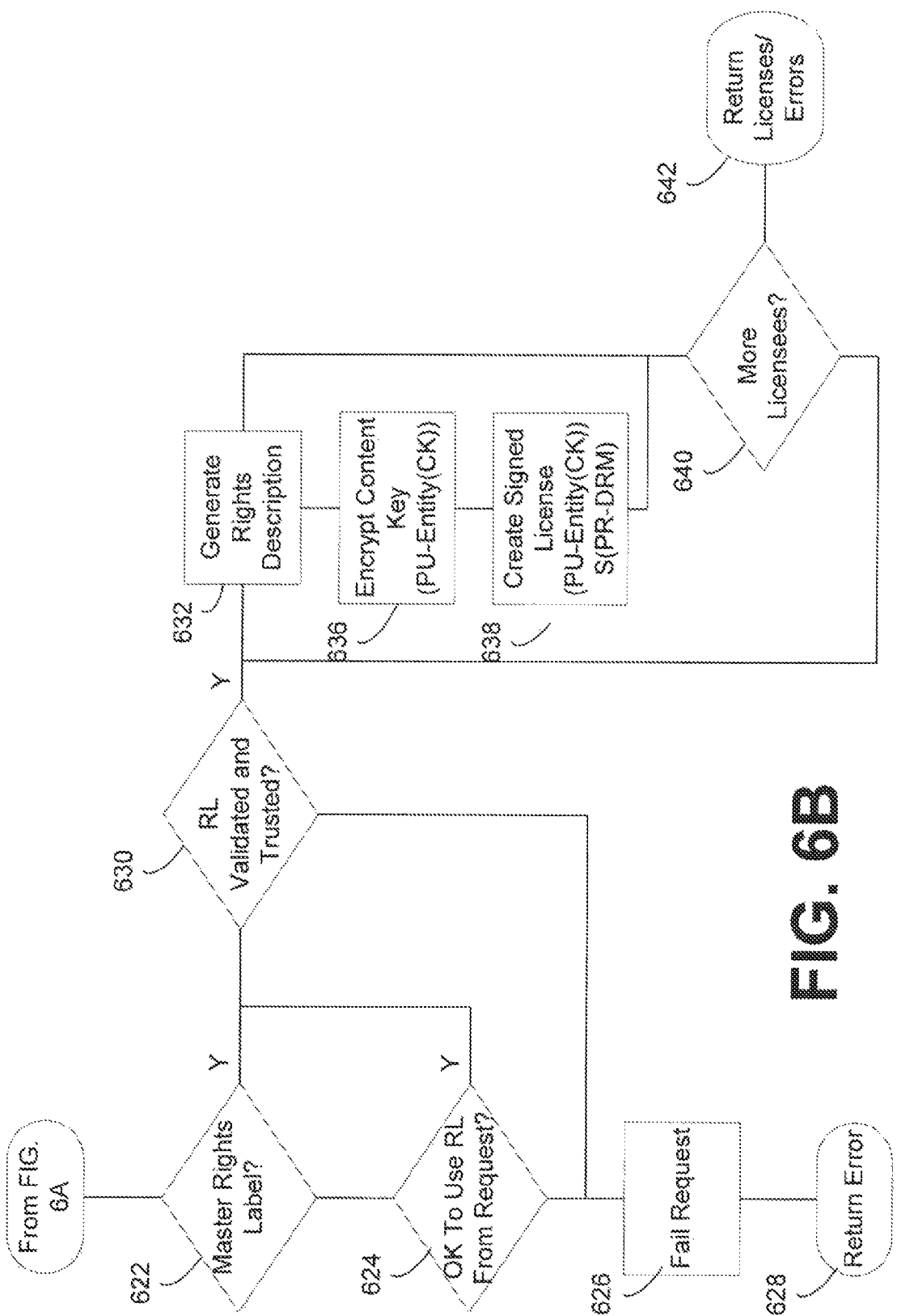

Turning now to FIGS. 6A and 6B, a method for licensing rights managed digital content is shown. At step 602, a license issuing entity such as a DRM server 320 receives a license request including either a public key certificate or an identity for each of one or more requested licensees. Presumably, if an identity is specified, the DRM server 320 can procure a corresponding public key certificate from a directory, a database, or the like. If a license is requested for only one licensee, only one certificate or identity is named. If a license is requested for a plurality of licensees, a certificate or an identity can be named for each potential licensee. At step 604, the requesting entity (i.e., the entity making the license request) is authenticated, if desired. At step 606, it is determined whether the entity is allowed to request a license, again if desired.

If, at step 608, the issuing entity determines that the public key certificate is not included in the license request, then the issuing entity uses the specified identity to perform a lookup in a directory service or database for the appropriate public key certificate. If, at step 610, the issuing entity determines that the certificate is in the directory, then, at step 612, the certificate is retrieved. If a certificate cannot be found for a given potential licensee, either in the request or in the directory, then the license server does not generate a license for that potential licensee and, at step 614, an error is returned to the requesting entity.

Assuming the DRM server 320 has a public key certificate for at least one potential licensee, then, at step 616, such DRM server 320 validates the trust of each licensee certificate. If not validated, the DRM server 320 determines that the issuer of the licensee certificate is not in the list of trusted issuers, then the request fails for that licensee, and an error is generated at step 614. Thus, any potential licensee whose certificate is not issued by a trusted issuer would not receive a license.

Additionally, the DRM server 320 preferably performs digital signature validation on all entities in the certificate chain going from the trusted issuer certificates to the individual licensee public key certificates. The process of validating the digital signatures in a chain is a well-known algorithm. If the public key certificate for a given potential licensee does not validate, or a certificate in the chain does not validate, the potential licensee is not trusted, and a license, therefore, is not issued to that potential licensee. Otherwise, at step 618, a license can issue. The process repeats at step 620 until all entities for which a license has been requested have been processed.

As shown in FIG. 6B, the DRM server 320 proceeds to validate the signed rights label 308 that is received in the license request. In one embodiment, the DRM server 320 has a master copy of every rights label signed thereby. At license time (at step 622), then, the DRM server 320 may retrieve a copy of the master rights label. The master rights label could be more up to date than the copy of the rights label sent in the license request, and therefore will be the rights label employed to produce the requested license. If no master rights label is found the DRM server 320, at step 624, determine according to pre-defined policy whether to issue a license based on the rights label in the request. If the policy does not allow, the license request fails at step 626, and an error is returned to the API 306 at step 628.

At step 630, the DRM server 320 validates the SRL 308 and specifically the digital signature thereof. If the SRL 308 does not validate, the license request fails at step 626, and an error is returned to the API 306 at step 628.

After all the validations have occurred, the DRM server constructs a license for each approved license based on the SRL 308. At step 632, the DRM server 320 generates a respective rights description for the license to be issued to each licensee. For each licensee, the DRM server 320 evaluates the identity named in the public key certificate of that licensee against the identities named in the rights description in the rights label. At step 636, the DRM server 320 obtains (PU-DRM(DES1)) and (DES1(CK)) from the SRL 308 and applies (PR-DRM) to obtain (CK). The issuing entity then re-encrypts (CK) using (PU-ENTITY) from the licensee's public key certificate to result in (PU-ENTITY(CK)). At step 638, the DRM server 320 concatenates the generated rights description with (PU-ENTITY(CK)) and digitally signs the resulting data structure using (PR-DRM) (i.e., S (PR-DRM)). The signed data structure is thus the license for this particular licensee.

At step 640, the DRM server 320 determines that there are no more licenses to generate for the particular request. The generated licenses are then returned to the requesting entity, at step 642, along with an appropriate certificate chain that ties the licenses back to a trusted authority.

Licensing By Way of a Directory

When issuing a license for protected content, the license issuing entity (hereinafter 'licensor') consults the sent SRL 308 from the content to determine which users/groups/clusters/divisions/platforms/etc. (hereinafter 'entities') are to be provided with rights, and the sent certificate to identify the license requester. Based thereon, the licensor determines which rights of those listed in the SRL 308 are to be issued to the requestor. Conceptually, the licensor inspects the entities listed in the SRL 308 and compares such entities with the requestor. Thus, if the SRL 308 specifies that a particular group is to receive a license and the requester is a member of such group, the requestor is granted a license with rights as set forth for the group in the SRL 308. Likewise, if the SRL 308 specifies that a particular user is to receive a license and the requestor is such user, the requestor is granted a license with rights as set forth for such user in the SRL 308. As may be appreciated, a particular SRL 308 may list several entities and rights therefor, and a particular requester may be granted a license based on being a member of one or more entities.

Figure 7:
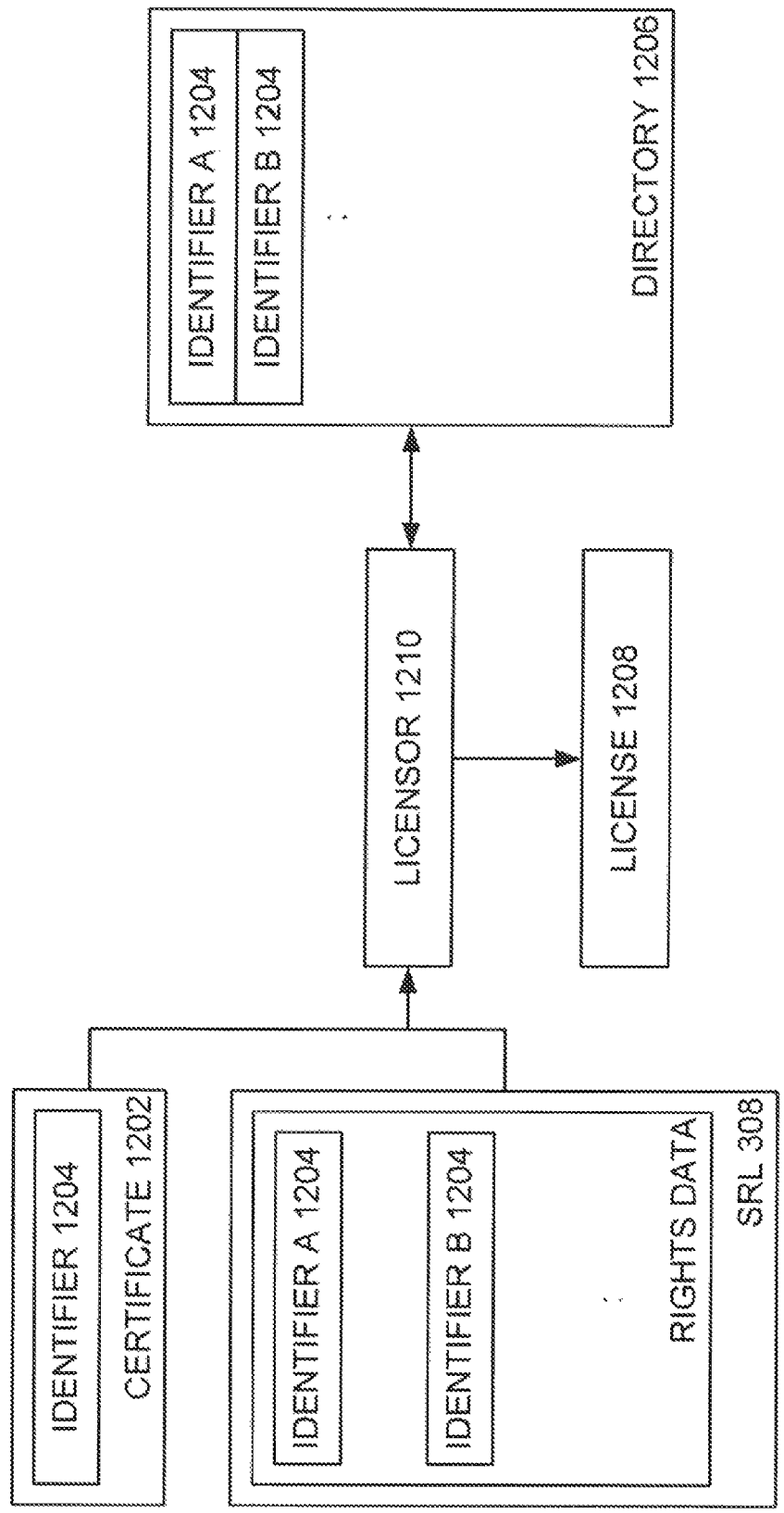
FIG. 7 is a block diagram showing a certificate and a rights label sent to a licensor by a requestor and the licensor referring to an organization directory in accordance with one embodiment of the present invention.

In one embodiment of the present invention, and as seen in FIG. 7, the requestor is identified in the sent certificate 1202 by way of an identifier 1204, where the identifier 1204 may for example be an alias through which the requestor is identified in an organizational directory 1206. Correspondingly, the SRL 308 lists therein each rights-entitled entity therein according to such an identifier 1204. Thus, and as part of processing a request for a license 1208, a licensor 1210, which is typically a DRM server 320, obtains the identifier 1204 of the requester from the certificate 1202 and compares the obtained identifier 1204 to all identifiers 1204 as listed in the sent SRL 308. If a match is found, the licensor 1210 issues a license 1208 to the requestor with the rights specified in the SRL 308 for the identifier 1204 of such requestor.

Moreover, with the availability of the directory 1206, the licensor 1210 may also determine whether the requestor is a member of any other entity listed in the SRL 308, presuming that the directory 1206 contains appropriate cross-referencing information that would reflect the requestor's membership status in each such other entity. Typically, a directory 1206 lists for each requestor not only the identifier 1204 thereof but also the identifier 1208 of each group/cluster/division/platform/other entity/etc. that the requestor is a member of. Note that the directory 1206 may include identifiers 1208 such as a mail address, an alternate mail address, an ID, an alternate ID, a group membership, a historic identifier, and/or the like.

With the certificate 1202 received from the requestor with the identifier 1204 thereof therein and with the rights data from the SRL 308 received from the requester, then, and generally speaking, the licensor 1210 issues a license 1208 to the requestor if, among other things, it can be determined from the directory 1206 that the requestor is a member of any entity listed in the SRL 308. If so, and assuming all other conditions for licensing are satisfied, the licensor 1210 issues the license 1208 to the requestor with the rights and conditions specified for the listed entity as obtained from the SRL 308.

In one embodiment of the present invention, an entity listed in the SRL 308 represents a group or cluster or some other collection of individuals (hereinafter 'group') where such group is appropriately represented within the directory 1206. Such group could include a mail-enabled group such as a distribution list or a mail alias, or a security group such as may defined in connection with a network operating system or the like.

Notably, specifying rights in an SRL 308 according to a group and issuing a license 1208 to a requestor according to group membership thereof effectuates digital rights management in an enterprise or organizational setting. For example, a document or email could be DRM-protected so that all members of a given department have rights to read the document or email. Assuming that a group (e.g. email alias) for such a department exists in the directory 1206 of the organization, which is most often the case, the author of the document or email would grant rights based on the group rather than individuals. As may be appreciated, advantages to such group-wise rights granting include ease of use for the author in specifying classes of individuals that have rights. In addition, by specifying rights according to a group, the specified rights do not become 'stale' as new individuals join the group and old individuals leave the group. Instead, all current members of the group are capable of exercising the rights as long as the membership of such group is kept up to date in the organizational directory 1206.

Determining Whether a Requestor is a Member of a Group

Typically, the directory 1206 is a repository of useful information that is of interest to the organization or a portion thereof. In particular, the directory 1206 holds several important pieces of information about each user in the organization, including every group that the user holds membership in. In fact, such memberships for a user may be defined at least in part by being listed in the directory 1206 according to the user.

Note that in the situation where the organization is especially large or otherwise so requires, computing therein may divided in some logical fashion into a plurality of divisions or 'forests'. Each forest may for example be geographically based, such as for example if the organization has one office in Wilkes-Barre, Pennsylvania and another office in Boynton Beach, Fla., in which case each such office is provisioned with a separate forest. Alternately, each forest may for example be functionally based, such as for example if the organization has an accounting department and a production department, in which case each such department is provisioned with a separate forest. Of course, forests may be defined according to any other criteria without departing from the spirit and scope of the present invention.

Figure 8:
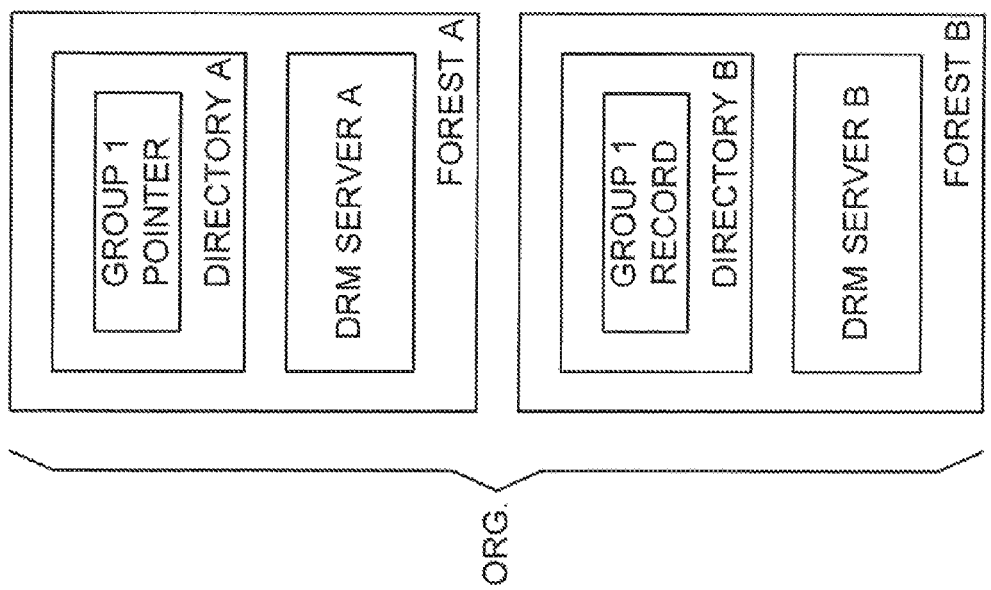
FIG. 8 is a block diagram showing an organization organized into a plurality of division or forests, where each forest has at least one DRM server and a directory in accordance with one embodiment of the present invention.

Significantly, it is presumed to be the case that each forest has its own directory 1206 or group of directories 1206 (hereinafter 'directory 1206'), and each forest has at least one DRM server 320. Referring now to FIG. 8, two forests, forest A and forest B, are shown for an organization, where forest A has a directory A and a DRM server A, and where forest B has a directory B and a DRM server B. As is to be appreciated, each forest acts as a protective enclave within which the corresponding directory and DRM server is deployed. Thus, DRM server A within forest A should be able to access information within directory A with relative ease, at least from a security point of view, while DRM server B within forest B is nearly as able to access information within directory A within forest A with such relative ease, again at least from a security point of view. Note, though, that multiple forests that have a need to inter-operate typically replicate information therebetween and optionally can set up explicit trust relationships therebetween.

Group Membership Determination Within a Forest

Figure 9:
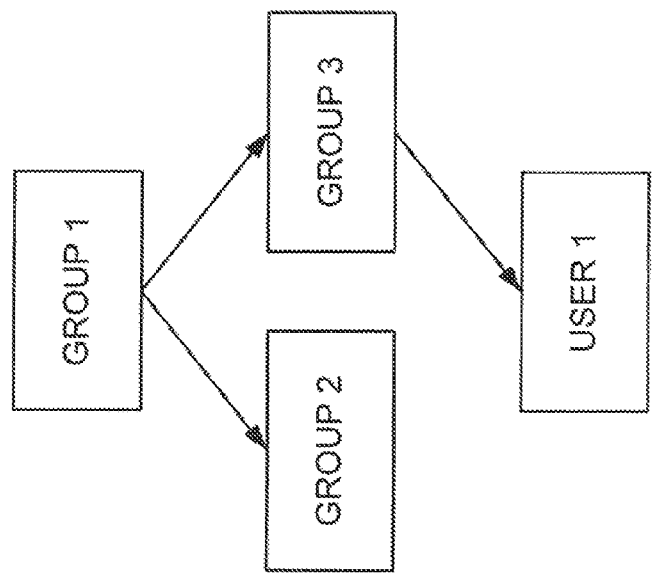
FIG. 9 is a block diagram showing various entities related by way of defined group memberships.

Assuming for the moment that the totality of the organization is represented by forest A of FIG. 8 and that forest B of FIG. 8 does not exist, it is to be appreciated that directory A of forest A maintains all directory information relevant to the organization, including all users and all groups that the users belong to. Note, here, that such groups may actually comprise multiple layers of groups. Thus, and as seen in FIG. 9, it may be the case that a group 1 has as direct members a group 2 and a group 3, and group 3 may have as direct members a user 1. In such an instance, user 1 is a direct member of group 3, an indirect member of group 1, and not a member of group 2. As may be appreciated then, if an SRL 308 lists rights for members of groups 1 or 3, user 1 may obtain a license 1208 based on such rights, assuming all other conditions are met, while if the SRL 308 lists rights for members of group 2 only, user 1 may not obtain such a license 1208. Put more generally, a user that is a direct or indirect member of a group named in an SRL 308 can obtain a license 1208 with whatever rights and conditions are granted to such group.

As seen in FIG. 10, the record objects/records in the directory A for each of groups 1 through 3 and user 1 are shown. Note that, as is typical, each record is in the form of a listing for the respective entity that includes both all direct members of the entity, assuming the entity is a group, and all direct memberships that the entity possesses, whether the entity is a user or a sub-group of another group. Thus, group 1 has groups 2 and 3 as direct members and is not a direct member of any other group, group 2 has no members and is a direct member of group 1, group 3 has user 1 as a direct member and is a direct member of group 1, and user 1 as a user has no members but is a direct member of group 3. Of course, directory A as shown in FIGS. 9 and 10 is grossly over-simplified and therefore would in reality very likely be much larger with many more users and groups. Nevertheless, such directory A as shown is suitable for purposes of describing the present invention.

In the course of user 1 submitting an SRL 308 to DRM server A, where the submitted SRL 308 lists one or more groups and rights therefor, then, the DRM server A decides whether to issue a license 1208 to user 1 at least in part by referring to directory A to determine whether user 1 is a direct or indirect member of any of the groups listed in the SRL 308. As may be appreciated, such a determination may be performed in one of two general manners—from the listed groups to the user, or from the user to the listed groups.

Performing the determination from the groups to the user is a more straight-forward process, typically, but since groups can have many members, it is likely that a relatively large amount of time must be spent examining all found users to determine whether a match exists. Performing the determination from the user to the groups is a less straight-forward process, typically, but since a user usually is not a member of too many groups, it is likely that a relatively small amount of time must be spent examining all found groups to determine whether a match exists. In any case, it has been found at least empirically that performing the determination from the user to the groups is more economical and desirable overall.

Still referring to FIGS. 9 and 10, and also now referring to FIG. 12, to make a group membership determination with regard to whether user 1 is a member of group 1, then, the DRM server A proceeds as follows. Preliminarily, the DRM server A asks directory A whether group 1 exists (step 1201). As may be appreciated, if the response to such an inquiry shows that group 1 does not exist, then the process is done inasmuch as user 1 cannot be a member of a group that does not exist (step 1203). Thus, despite the fact that the determination is performed from the user to the group, the preliminary step of asking whether the group exists is performed to avoid performing any additional steps if unnecessary.

Of course, as shown, group 1 does indeed exist, so the response would in actuality be yes. Thus, the DRM server A asks directory A for all groups that user 1 is a member of and directory A returns with the information that user 1 is a member of group 3 (steps 1205,1207). Of course, group 3 is not group 1, so the DRM server A has not as yet determined whether user 1 is a member of group 1 (step 1209). Nevertheless, the DRM server A must continue if it is the case that user 1 might later be found to be an indirect member of group 1 by way of being a direct member of group 3 and group 3 being a direct or indirect member of group 1.

The DRM server A thus continues by asking directory A for all groups that group 3 is a member of and directory A returns with the information that group 3 is a member of group 1 (steps 1211,1213). As a result, DRM server A has determined that user 1 is in fact an indirect member of group 1 by way of being a member of group 3 (step 1215).

As should now be appreciated, the DRM server A may have to recursively query through many more groups and many more iterations to finally determine that user 1 is in fact a member of group 1. Alternatively, if it were the case that user 1 was not in fact a member of group 1, the DRM server A would have to query through the entirety of all possible group membership for user 1, direct and indirect, before finally determining that user 1 is not a member of group 1. As will be described in more detail below, because such querying can be expensive and may be performed on a continuing basis, the results of such exploration may be stored in one or more caches.

Group Membership Determination Across Forests

When an organization has multiple forests deployed and the user and group membership information needs to be available across forest boundaries, there is no straightforward way to determine group membership of a user with regard to a particular group, especially when the querying DRM server 320 is in a forest that does not natively hold the required information in the directory thereof. Instead, the DRM server 320 must consult another forest where such information is indeed natively held.

In particular, of special interest is the situation where a DRM server 320 such as DRM server A of FIG. 8 is asked to issue a license to a user based on an SRL 308 that lists a group, where the group is not native to forest A within which DRM server A resides. Instead, such group is native to forest B and therefore has a record in directory B of forest B. As a result, a group membership determination with regard to whether the user at issue is a member of the group at issue must be made with respect to directory B of forest B inasmuch as such directory B has the record for the group at issue with the group information for such group.

However, and significantly, DRM server A of forest A typically cannot directly query directory B of forest B to obtain substantive directory information since such cross-forest querying is usually limited or prevented out of security concerns. Instead, and in one embodiment of the present invention, DRM server A asks DRM server B of forest B to query directory B of forest B and to report back to DRM server A with the results of the query. Note that the DRM server B to directory B query is not a cross-forest query and therefore does not suffer the limitations thereof.

It must be appreciated, though, that the DRM server A prior to asking DRM server B to perform the query must actually know that DRM server B is in fact the proper DRM server 320 to perform the query inasmuch as the group at issue is native to forest B. Put more simply, DRM server A must know that the group at issue is native to forest B prior to asking DRM server B to query directory B. However, DRM server A can only query directory A and therefore would not know of the native forest of the group at issue unless such directory A has such information.

Accordingly, and in one embodiment of the present invention, directory A indeed does have such information, as is seen in FIG. 8. In particular, directory A has a pointer object for the group at issue that directs any querying entity with regard to the group at issue to forest B. Such pointer object may for example include an address of forest B that is returned to querying DRM server A upon such DRM server A requesting information about the group at issue. Presumably, directory B of forest B has a record object for the group at issue. Thus, DRM server A may employ such address to find forest B and proceed from there.

In one embodiment of the present invention, the address of forest B is in particular the address of directory B within forest B. Such DRM server A with such address then contacts such directory B based thereon. However, since DRM server A is in forest A and directory B is in forest B, and as was alluded to above, directory B does not normally provide any substantive information across forests to DRM server A. Nevertheless, directory B can provide to DRM server A the address of DRM server B.

Accordingly, and in one embodiment of the present invention, DRM server A receives the address of DRM server B from directory B, and based thereon asks DRM server B to query directory B on behalf of DRM server A. In particular, DRM server A requests DRM server B to query directory B whether the user at issue is a member of the group at issue, and to return the answer to DRM server A. Presumably, such request includes some sort of identification of DRM server A as a DRM server 320 within the DRM universe, such as for example an identifying certificate with a certificate chain leading back to a trusted root of authority as recognized by DRM server B. Accordingly, DRM server B executes the query of directory B on behalf of DRM server A only if the identifying certificate verifies.

Presuming DRM server B indeed executes the query of directory B on behalf of DRM server A, such as in the manner set forth above with regard to FIG. 12, DRM server B eventually determines whether the user at issue is a member of the group at issue and returns such information to DRM server A as the response to the request therefrom.

Note that when DRM server B asks directory B if the user at issue is a member of the group at issue, such user at issue must be represented within directory B, at least by a pointer object if not by a record object. Moreover, such pointer object must include information regarding each group that the user at issue is a member of, especially inasmuch as such member-of information is referenced when the group membership information is determined from the user to the group, as was described above.

Figure 13:
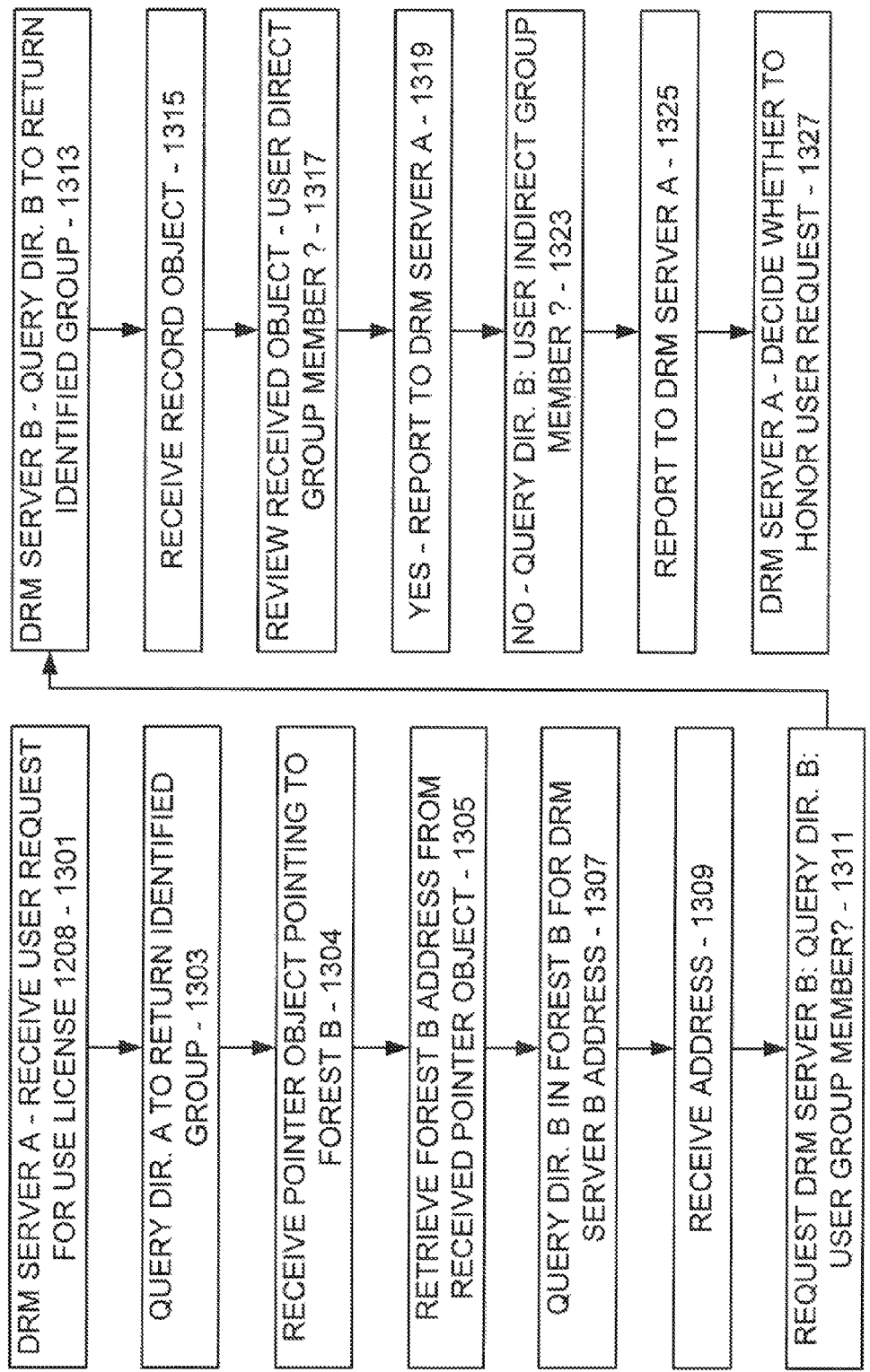
FIG. 13 is a flow diagram showing key steps performed by a DRM server of FIG. 8 when determining whether a user is a member of a group that is not native to the forest of the DRM server, in accordance with one embodiment of the present invention.

Turning now to FIG. 13, and to recap, DRM server A and DRM server B on behalf of DRM server A perform the following steps to determine group membership across forests:

Preliminarily, DRM server A receives a request from a user for a use license 1208 corresponding to a piece of content (step 1301). The request includes a certificate identifying the user and the SRL 308 associated with the content. In response, and assuming the SRL 308 identifies a group therewithin, and also assuming appropriate cached information is not present, DRM server A queries directory A to return any object for the identified group (step 1303). The present scenario assumes that the group is native to forest B so such group is in fact represented within directory A as a pointer object pointing to forest B, and DRM server A receives the pointer object pointing to forest B from directory A, thus signifying that the group is native to forest B (step 1304), and retrieves the address of forest B from the received pointer object (step 1305).

Thereafter, DRM server A employs the retrieved address to query directory B in forest B for the address of DRM server B and directory B returns such address to DRM server A in response thereto (steps 1307, 1309). The particular mechanism of getting the address of DRM server B is known or should be apparent to the relevant public and therefore need not be discussed herein in any detail. Thus, any appropriate mechanism may be employed without departing from the spirit and scope of the present invention.

With the address of DRM server B, DRM server A then requests DRM server B to query directory B whether the user is a member of the group (step 1311). Again, the particular mechanism employed by DRM server A to deliver the request to DRM server B is known or should be apparent to the relevant public and therefore need not be discussed herein in any detail. Thus, any appropriate mechanism may be employed without departing from the spirit and scope of the present invention.

As with DRM server A, and again assuming appropriate cached information is not present, DRM server B queries directory B to return any object for the identified group (step 1313). The present scenario assumes that the group is native to forest B so such group is in fact represented within directory B as a record object, and DRM server B receives the record object from directory B, thus signifying that the group is native to forest B (step 1315). Note that DRM server B may at this point review the members of the group as set forth in the received object to determine whether the user is a direct member of the group (step 1317). If so, the determination is positive and DRM server B reports same to DRM server A (step 1319). If not, DRM server B queries directory B to return any object for the user and thus proceeds to determine whether the user is a member of the group by attempting to traverse within directory B from the user to the group in a manner akin to that shown in connection with FIG. 12 (step 1323). Upon finishing the attempted traversal, DRM server B will have determined whether a member relationship exists between the user and the group, and reports same to DRM server A (step 1325).

Of course, based on such determination, DRM server A decides whether to honor the request from the user as received at step 1301 (step 1327). As may be appreciated, if the user is not a member of the group, the request is denied, unless of course it is found that the user is a member of another group identified in the received SRL 308. Likewise, if the user is a member of the group, the request is honored, presuming that all other conditions for so honoring are met.

Determining User Group Membership By Way of Cached Information

As thus far described above, a DRM server 320 in the course of issuing a license 1208 to a user based on an SRL 308 can determine whether the user is a member of a group identified in the SRL 308 by referring to a directory 1206 within the forest of the DRM server 320 or in another forest. As may be appreciated, though, referring to a directory 1206 each time a determination is to be made can become relatively expensive and cumbersome, especially in terms of the additional network traffic and the work necessary to be performed by the directory 1206, and especially if the number of determinations made becomes relatively high.

Accordingly, and in one embodiment of the present invention, user-group information as derived from one or more directories 1206 is cached at one or more locations that are accessible to the DRM server 320. In addition, and in one embodiment of the present invention, the DRM server 320 when making a user-group determination employs a lowest-cost-first algorithm to review multiple cache locations in order of lowest cost to highest cost prior to referring to a directory 1206. Thus, higher cost operations are postponed for as long as possible, determination speed is increased, and network traffic is reduced.

Caching User-Group Information

In the course of determining from a directory 1206 whether a user is a member of a group, such as was disclosed in connection with FIG. 12, a DRM server 320 potentially locates at least some other groups that the user is a direct or in indirect member of. Note that inasmuch as the traversal stops once a membership path is in fact found, it is likely that not all groups of the user are found. For example, if in examining the record object for the group at issue it is found that the user is a direct member of such group, then no other groups that the user is a direct or indirect member of are found. Likewise, if it is necessary to traverse from the user to the group in an attempt to find a membership path therebetween, then at least the groups that the user is a direct member of are found, but some indirect groups may not be found because a membership path was found beforehand. Nevertheless, in one embodiment of the present invention, the DRM server 320 stores whatever knowledge it has of the user and all direct or indirect group membership thereof in one or more caches for future reference should that be necessary.

Figure 14:
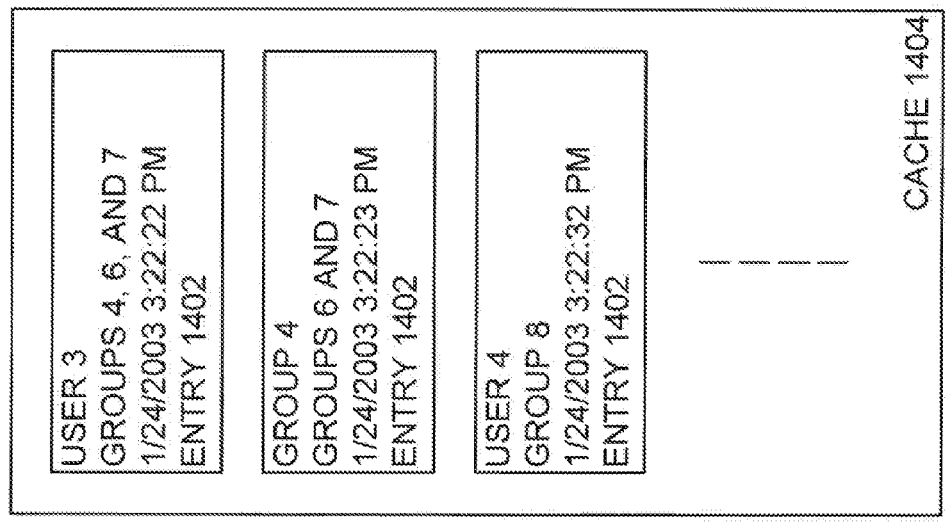
FIG. 14 is a block diagram showing entries in a cache in accordance with one embodiment of the present invention.

Referring now to FIG. 14, multiple entries 1402 of a cache 1404 are seen. In particular, it is seen from one entry 1402 in the cache 1404 that for a user 3, it has been found that such user 3 is a member, either directly or indirectly, of groups 4, 6, and 7, and that group 4 is a member of groups 6 and 7. Similarly, it is seen from another entry 1402 in the cache 1404 that for a user 4, it has been found that such user 4 is a member of group 8 only. Whether such users 3 and 4 and group 4 are direct or indirect members of such groups is believed to be immaterial and accordingly is not delineated, although such information may so be delineated if found to be necessary or useful. What is material is that all group memberships for a user/group are cached as any particular user-group relationship may be useful at some later time to establish a user-group relationship for the same or different user/group.

As may be appreciated, information in the cache 1404 as obtained from the directory 1206 can become 'stale' after a period of time. That is, over time, users can become deleted from the directory 1206, additional groups and group memberships can be defined, and the like, and yet the cache 1404 is not automatically updated to reflect such changed information. Accordingly, and as seen from FIG. 14, each entry 1402 of the cache 1404 includes a time of creation. Based on such creation time, then, any querying entity querying the cache 1404 can decide whether the entry 1404 is too old to be relied upon. In addition or in the alternative, the cache 1404 may on its own delete each entry 1404 therein that is deemed too old based on the creation time thereof.

Figure 15:
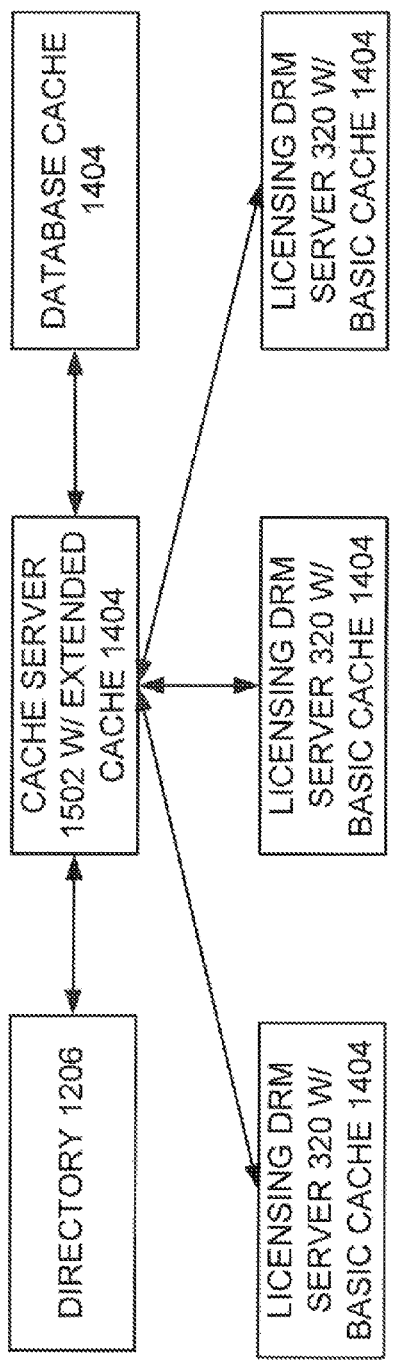
FIGS. 15 and 16 are block diagrams showing variations of a cache architecture employing the cache of FIG. 14 in accordance with one embodiment of the present invention.
Figure 16:
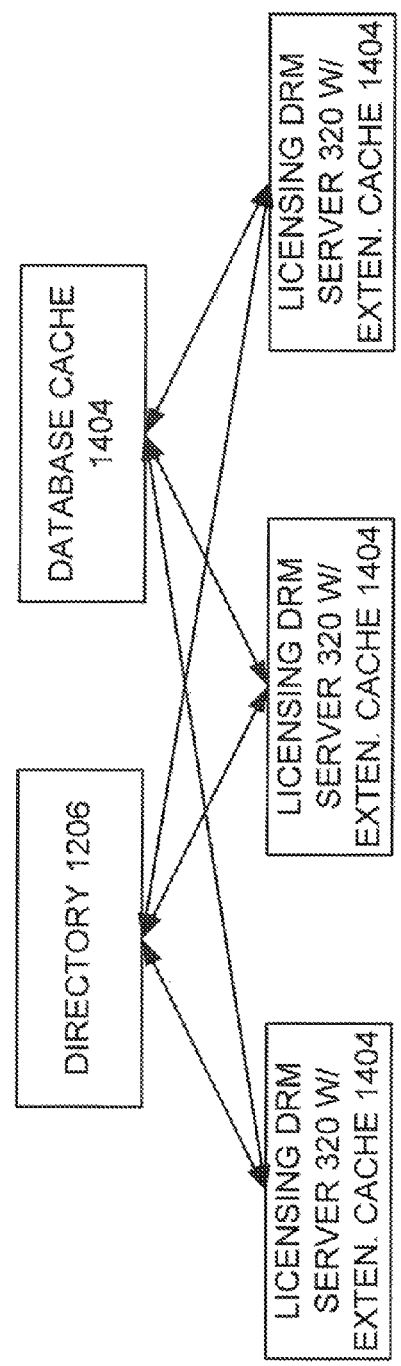

Turning now to FIGS. 15 and 16, it is seen that the cache 1404 of FIG. 14 may be implemented in a number of configurations. In one configuration, each license-issuing DRM server 320 in a forest has a cache 1404 that is a relatively basic light-weight in-memory cache, and the forest also has a dedicated cache server 1502 (FIG. 15) with a cache 1404 that is a relatively extended heavier-weight in-memory cache. In addition, the dedicated cache server 1502 may employ a database cache 1404, and/or may perform queries on the directory 1206 on behalf of the license-issuing DRM servers 320.

In another configuration, each license-issuing DRM server 320 in a forest has a cache 1404 that is a relatively extended heavier-weight in-memory cache (FIG. 16), and performs queries on the directory 1206. No dedicated cache server 1502 is present, although a database cache 1404 may be shared among all license-issuing DRM servers 320 in the forest. In any configuration, each basic cache 1404 has user information only, while each extended cache 1404 has user and group information.

Lowest-Cost-First Algorithm

Regardless of the configuration of the caches 1404, a DRM server 320 seeking to determine whether a user is a member of a group employs the lowest-cost-first algorithm of the present invention to search the caches 1404 and the directory 1206 in the order of lowest-cost to highest cost. Presumptively, the cache 1404 associated with the DRM server 320 has the lowest cost associated therewith, the cache 1404 associated with a dedicated cache server 1502 and the database cache 1404 have a higher cost associated therewith, and the directory 1206 has the highest cost associated therewith. Of course, cost can be subjective and at any rate a particular entity may have any particular cost without departing from the spirit and scope of the present invention.

Figure 17A:
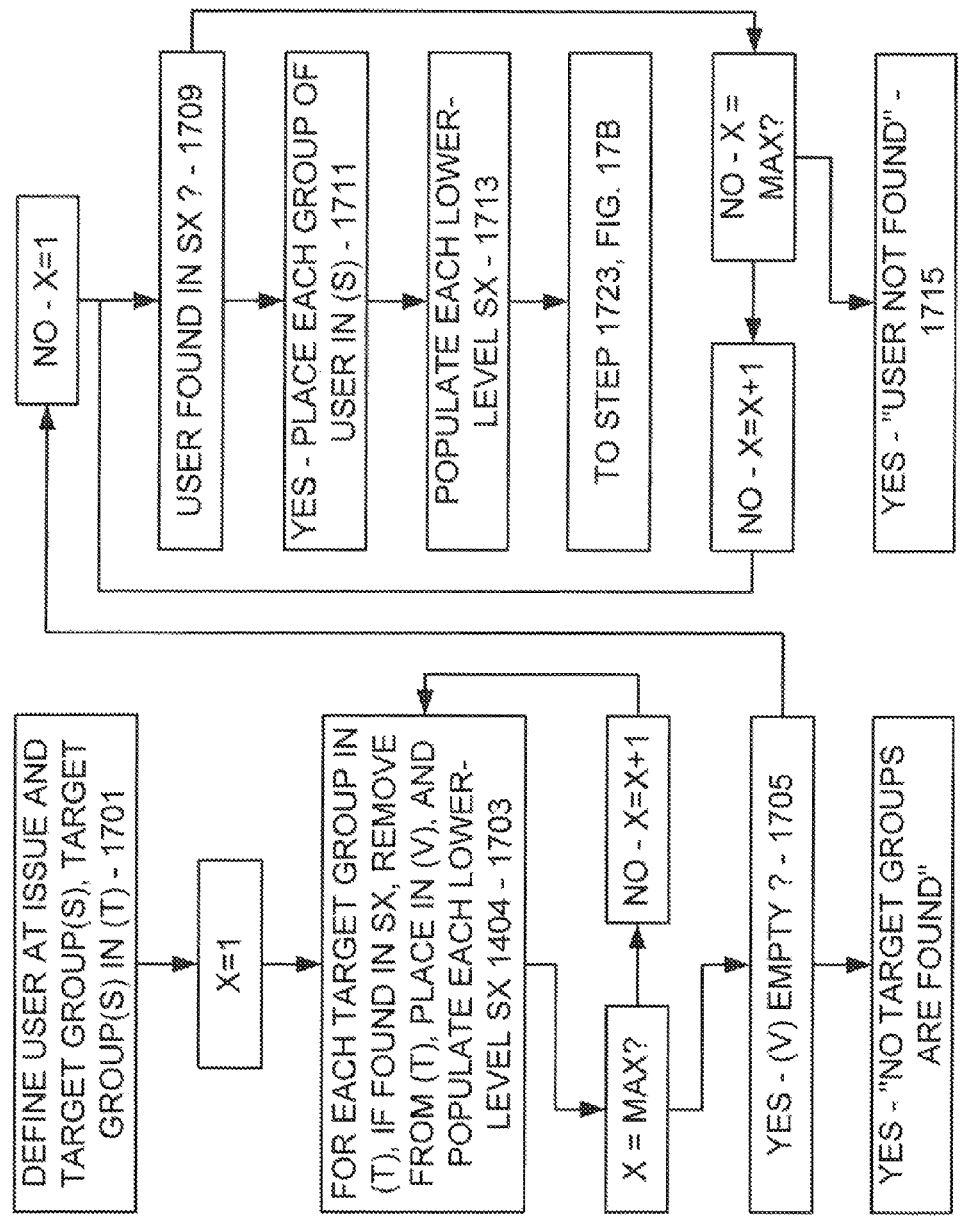

Turning now to FIGS. 17A and 17B, it is seen that the main characteristic of the algorithm is that an operation believed to have a higher cost is not attempted before all operations believed to have a lower cost have been exhausted. Generally, the operations in the order of increasing cost are look-up in the in-memory cache 1404 of the licensing DRM server 320, look-up in the database cache 1404 or the cache 1404 of the dedicated cache server 1502, and look-up in the AD. In performing the algorithm, a user and one or more target groups are submitted, and a determination is made of whether the user is a member, either directly or indirectly, of any of the target groups. Essentially, the algorithm traverses from the user to any of the target groups by way of all available membership information from the caches 1404 and the directory 1206, again always performing a lower-cost operation before performing a higher-cost operation. The algorithm returns as a result a "yes" if the user is a member of one of the target groups, a "no" if the user is not a member of any of the target groups, a "user not found" if the user is not in the directory 1206, and a "no target groups are found" if none of the target groups are found in the directory 1206.

As seen in FIG. 17A, the process begins by defining the user at issue and the target group or groups (step 1701). Assuming for the moment that the DRM server 320 has a local cache 1404 and has access to a remote cache 1404 (which may be the dedicated cache server 1502 or the database cache 1404) and the directory 1206, the algorithm as employed by the license-issuing DRM server 320 employs a number of bins and queues, including:

a target bin (T) within which resides the target group or groups;

a validated target bin (V) within which will reside the target group or groups that have been validated;

a search bin (S) within which will reside the groups waiting to be searched;

a local queue (Q1) within which will reside the groups to be searched for in the local cache 1404;

a remote queue (Q2) within which will reside the groups to be searched for in the remote cache 1404;

a directory queue (Q3) within which will reside the groups to be searched for in the directory 1206; and a discard bin (D) within which will reside the groups already processed.

Thus, the algorithm proceeds by validating the target group or groups, by, for each target group in the target bin, searching to find a record or entry 1402 for the target group. Since essentially the same process is performed with regard to each storage device (S1, corresponding to the local cache 1404; S2, corresponding to the remote cache 1404; and S3, corresponding to the directory 1206), such process need only be described with reference to a generic storage Sx.

In particular, the algorithm first looks at the S1, the local cache 1404, and for each target group in the target bin (T), if such target group is found as an entry 1402 in the local cache 1404, the target group is removed from (T), and the target group is placed in the validated target bin (V) and the entry 1402 thereof is placed in any lower-level caches 1404, which in this instance do not exist (step 1703). Thereafter, the algorithm repeats step 1703 with respect to S2, the remote cache 1404, and for each target group remaining in (T), if such target group is found as an entry 1402 in the remote cache 1404, the target group is removed from (T), and the target group is placed in (V) and the entry 1402 thereof is placed in any lower-level caches 1404, which in this instance is the local cache 1404. Finally, the algorithm again repeats step 1703 with respect to S3, the directory 1206, and for each target group still remaining in (T), if such target group is found as a record in the directory 1206, the target group is removed from (T), and the target group is placed in (V) and the entry 1402 thereof is placed in any lower-level caches 1404, which in this instance are the local and remote caches 1404.

Upon performing step 1703 for each storage device, then, the validated target bin (V) should contain all target groups that have been found to exist either in a cache 1404 or the directory 1206. All target groups remaining in the target bin, then, can be assumed to be bad or no longer in existence, and therefore can be ignored. If it is the case that (V) is empty, the algorithm ends as no validated target groups exist, and the algorithm returns a "no target groups are found" (step 1705). As should be noted, by copying a record or entry 1402 from the directory 1206 or remote cache 1404 to all lower level caches 1404, such lower level caches 1404 become charged with cache information that may be employed for future determinations of whether a user is a member of a group.

Thereafter, presuming at least one validated target group exists in (V), the algorithm validates the user. In particular, the algorithm searches for a record or entry 1402 for the user at issue (step 1709), first by looking at S1, the local cache 1404, then at S2, the remote cache 1404, and then at S3, the directory. Upon finding a record or entry 1402 (hereinafter, 'item') for the user at any iteration of step 1709, the algorithm places each group that the user is a member of into the search bin (S) (step 1711), and in addition populates all lower level caches 1404 with an entry 1402 for the user (steps 1713). Note that if no item for the user is found from any iteration of step 1709, the algorithm ends as no validated user exist, and the algorithm returns a "user not found" (step 1715)

As may be appreciated, step 1709 is iterated in the order perceived to correspond to the lowest-cost operation to the highest-cost operation, which in this case is with regard to S1, then S2, then S3. Accordingly, once a user is validated, higher-cost operations are avoided. Note that the user may be validated prior to the target group or groups without departing from the spirit and scope of the present invention.

Presuming that a validated user is found that is a member of at least one group as represented by such group being in (S), and at least one validated target group is found as represented by a corresponding item in (V), and turning now to FIG. 17B, the algorithm continues by determining from (S) and (V) whether any group in (S) matches any group in (V) (i.e., the validated target group or groups) (step 1723). If indeed a group in (S) is found to match an item in (V), the algorithm ends with a match, and the algorithm returns a "yes" (step 1725). Otherwise, the algorithm continues by moving all groups in (S) to the local queue (Q1) (step 1727).

Thereafter, the algorithm performs an iterative process to search for a membership path from the user to any target group. The iterative process requires multiple searches in the local and remote caches 1404 and the directory 1206 to determine group memberships. Since essentially the same process is performed with regard to each of the queues (Q1, corresponding to the local cache 1404; Q2, corresponding to the remote cache 1404; and Q3, corresponding to the directory 1206), such process need only be described with reference to a generic (Qx) and a generic storage Sx, as is shown in FIG. 17B, where S1 is the local cache 1404; S2 the remote cache 1404, and S3 the directory 1206.

In particular, and assuming for the moment that (Qx) and Sx in FIG. 17B are (Q1) and S1, the local cache 1404, a determination is first made whether (Q1) is empty (step 1729). Of course, (Q1) should not initially be empty, but since the process is iterative, there may come a point at which (Q1) is indeed empty. Assuming that (Q1) is not initially empty, then, but instead has a group therein, such a group is selected and removed from (Q1) and it is determined whether such group is already in the discard bin (D) (step 1731). Initially, of course, the group selected and removed from (Q1) is not in (D) inasmuch as the group has not already been processed, but as the process iterates other groups may be placed into (Q1), including perhaps groups that have been previously processed, and as each group is processed it will indeed be moved into (D).

If the group selected and removed from (Q1) has already been processed and is therefore in (D), the algorithm returns to step (1729), where it is again determined whether (Q1) is empty. However, if the group selected and removed from (Q1) has not already been processed and is therefore not in (D), the algorithm continues by searching for an entry 1402 for the selected group in the cache 1404 or directory 1206 corresponding to (Q1), which in this case is the local cache 1404 (step 1733).

If no such entry 1402 for the selected group is found in the local cache 1404, the process continues by moving the group from (Q1) to the remote queue (Q2) (step 1735), and then returning to step (1729), where it is again determined whether (Q1) is empty. However, if such an entry 1402 for the selected group is found in the local cache 1404, the algorithm places each newly discovered group that the selected group is a member of into the search bin (S) and moves the selected group to the discard bin (D) (step 1739), and in addition populates all lower level caches 1404 with an entry 1402 corresponding to the selected group (step 1737). Note, of course that with regard to (Q1) and the local cache 1404, no such lower level caches 1404 exist. Thereafter, the algorithm continues by returning to step 1723, where it is determined whether any group in (S) (i.e., the newly discovered group(s)) matches any group in (V) (i.e., the validated target group or groups). Of course, if indeed a group in (S) is found to match an item in (V), the algorithm ends with a match, and the algorithm returns a "yes" as at step 1725. Otherwise, the algorithm continues by moving all groups in S to the local queue (Q1) as at step 1727, and the algorithm continues.

In so doing, the algorithm by way of (Q1) develops all possible paths from the user to any of the validated target groups to the extent possible with the local cache 1404. As may now be appreciated, assuming a match is not found, (Q1) fills up with more newly discovered groups as the process iterates and empties until all groups in (Q1) are processed by way of the local cache 1404 either to the discard bin (D) or to (Q2) to be processed by way of the remote cache 1404. Thus, operations at the remote cache 1404, which are presumed to be more costly, do not occur until all possible operations at the local cache 1404 are exhausted, as occurs when (Q1) is found to be empty at step 1729.

When in fact (Q1) is found to be empty at step 1729, processing then turns to the remote queue (Q2) in a manner similar to that which occurs with regard to (Q1). In particular, and assuming now that (Qx) and Sx in FIG. 17B are (Q2) and S2, the remote cache 1404, a determination is first made whether (Q2) is empty (step 1729). Here, (Q2) is likely not initially empty, although such an event could occur in the case where the local queue 1404 can itself process all groups from (Q1). Assuming that (Q2) is not initially empty, then, but instead has a group, such a group is selected and removed from (Q2) and it is determined whether such group is already in the discard bin (D) as having been processed (step 1731).

If the group selected and removed from (Q2) has already been processed and is therefore in (D), the algorithm returns to step (1729), where it is again determined whether (Q2) is empty. However, if the group selected and removed from (Q2) has not already been processed and is therefore not in (D), the algorithm continues by searching for an entry 1402 for the selected group in the cache 1404 or directory 1206 corresponding to (Q2), which in this case is the remote cache 1404 (step 1733).

If no such entry 1402 for the selected group is found in the remote cache 1404, the process continues by moving the group from (Q2) to the directory queue (Q3) (step 1735), and then returning to step (1729), where it is again determined whether (Q2) is empty. However, if such an entry 1402 for the selected group is found in the remote cache 1404, the algorithm places each newly discovered group that the selected group is a member of into the search bin (S) and moves the selected group to the discard bin (D) (step 1739), and in addition populates all lower level caches 1404 with an entry 1402 corresponding to the selected group (step 1737). Note, of course that with regard to (Q2) and the remote cache 1404, only local cache 1404 need be so populated. Thereafter, the algorithm continues by returning to step 1723, where it is determined whether any group in (S) (i.e., the newly discovered group(s)) matches any group in (V) (i.e., the validated target group or groups). Of course, if indeed a group in (S) is found to match an item in (V), the algorithm ends with a match, and the algorithm returns a "yes" as at step 1725. Otherwise, the algorithm continues by moving all groups in S to the local queue (Q1) as at step 1727, and the algorithm continues back with (Q1) being processed.

In so doing, the algorithm by way of (Q2) develops all possible paths from the user to any of the validated target groups to the extent possible with the remote cache 1404. As may now be appreciated, assuming a match is not found, (Q2) fills up with more newly discovered groups as the process iterates and empties until all groups in (Q2) are processed by way of the remote cache 1404 either to the discard bin (D) or to (Q3) to be processed by way of the directory 1206. Thus, operations at the directory 1206, which are presumed to be more costly, do not occur until all possible operations at the remote cache 1404 are exhausted, as occurs when (Q2) is empty.

Significantly, any groups newly discovered by way of (Q2) and the remote cache 1404 are first processed by way of (Q1) and the local cache 1404. Thus, and again, operations at the remote cache 1404, which are presumed to be more costly, do not occur with regard to the newly discovered groups until all possible operations at the local cache 1404 are exhausted, as occurs when (Q1) is empty.

When in fact (Q2) is found to be empty at step 1729, processing then turns to the directory queue (Q3) in a manner similar to that which occurs with regard to (Q1) and (Q2). In particular, and assuming now that (Qx) and Sx in FIG. 17B are (Q3) and S3, the directory 1206, a determination is first made whether (Q3) is empty (step 1729). Here, and again, (Q3) is likely not initially empty, although such an event could occur in the case where the local and remote queues 1404 can themselves process all groups from (Q1) and (Q2). Assuming that (Q3) is not initially empty, then, but instead has a group, such a group is selected and removed from (Q3) and it is determined whether such group is already in the discard bin (D) as having been processed (step 1731).

If the group selected and removed from (Q3) has already been processed and is therefore in (D), the algorithm returns to step (1729), where it is again determined whether (Q3) is empty. However, if the group selected and removed from (Q3) has not already been processed and is therefore not in (D), the algorithm continues by searching for an entry 1402 for the selected group in the cache 1404 or directory 1206 corresponding to (Q3), which in this case is the directory 1206 (step 1733).

If no such entry 1402 for the selected group is found in the directory 1206, the process continues by moving the group out of (Q3) to (D) (step 1735), and then returning to step (1729), where it is again determined whether (Q3) is empty. Note that since there is no next queue after (Q3), the selected group cannot be further processed. However, if such an entry 1402 for the selected group is found in the directory 1206, the algorithm places each newly discovered group that the selected group is a member of into the search bin (S) and moves the selected group to the discard bin (D) (step 1739), and in addition populates all lower level caches 1404 with an entry 1402 corresponding to the selected group (step 1737). Note, of course that with regard to (Q3) and the directory 1206, local and remote caches 1404 need be so populated. Thereafter, the algorithm continues by returning to step 1723, where it is determined whether any group in (S) (i.e., the newly discovered group(s)) matches any group in (V) (i.e., the validated target group or groups). Of course, if indeed a group in (S) is found to match an item in (V), the algorithm ends with a match, and the algorithm returns a "yes" as at step 1725. Otherwise, the algorithm continues by moving all groups in S to the local queue (Q1) as at step 1727, and the algorithm continues back with (Q1) being processed.

In so doing, the algorithm by way of (Q3) develops all possible paths from the user to any of the validated target groups to the extent possible with the directory 1206. As may now be appreciated, assuming a match is not found, (Q3) fills up with more newly discovered groups as the process iterates and empties until all groups in (Q3) are processed by way of the directory 1206 to the discard bin (D).

Significantly, any groups newly discovered by way of (Q3) and the directory 1206 are first processed by way of (Q1) and the local cache 1404. Thus, and again, operations at the directory 1206, which are presumed to be more costly, do not occur with regard to the newly discovered groups until all possible operations at the local and remote caches 1404 are exhausted, as occurs when (Q1) and (Q2) are empty.

When in fact (Q3) is found to be empty at step 1729, processing can go no further inasmuch as there is no (Q4) in this particular scenario, and is therefore complete. In particular, the algorithm ends without a match, and the algorithm returns a "no" (step 1741).

It should now be appreciated that the algorithm of the present invention is designed to perform the lowest-cost operation first before performing any higher cost operation. As should be appreciated, the algorithm although disclosed in terms of three levels of storage (i.e., the local and remote caches 1404 and the directory 1206) could instead be applied to any other number of levels of storage, including 2, 4, 5, 6, 7, and the like, by defining a like number of queues. Accordingly, the algorithm of the present invention may be applied to any multi-level storage arrangement of cached user-group information without departing from the spirit and scope of the present invention.

CONCLUSION

The programming necessary to effectuate the processes performed in connection with the present invention is relatively straight-forward and should be apparent to the relevant programming public. Accordingly, such programming is not attached hereto. Any particular programming, then, may be employed to effectuate the present invention without departing from the spirit and scope thereof.

In the present invention, a digital rights management (DRM) and enforcement architecture and method allow the controlled rendering or playing of arbitrary forms of digital content, where such control is flexible and definable by the content owner/developer of such digital content. The architecture allows and facilitates such controlled rendering, especially in an office or organization environment or the like where documents are to be shared amongst a defined group of individuals or classes of individuals. Such architecture allows a license for content to be obtained across forests.

It should be appreciated that changes could be made to the embodiments described above without departing from the inventive concepts thereof. For example, although the present disclosure describes determining group membership from the user to the group, such determination may alternatively be made from the group to the user without departing from the spirit and scope of the present invention. It should be understood, therefore, that this invention is not limited to the particular embodiments disclosed, but it is intended to cover modifications within the spirit and scope of the present invention as defined by the appended claims.

The invention claimed is:

1. A method for determining whether a user from an organization is a member of a group pre-defined within the organization, wherein the group is identified in a signed rights label that delimits digital licenses that a license server has validated, each digital license specifying a set of rights, the signed rights label naming one or more groups and specifying a set of corresponding rights for each group, the organization maintaining a computer network comprising at least a forest A and a forest B, forest A having a directory A and a querying entity A directory A, forest B having a directory B and a querying entity B configured to query directory B, the group being native to either forest A or forest B, the method comprising:

querying entity A receiving a request from the user within forest A for a digital license to render a corresponding piece of digital content within forest A, the request including an identification of the user and an identification of the group;

querying entity A querying directory A of forest A to return any object therein associated with the group, the group instead being native to forest B such that directory B of forest B has therein a record object corresponding to the group, the record object for the group in directory B including all direct members of the group, directory A of forest A having therein a pointer object corresponding to the group, the pointer object in directory A including an address of forest B;

querying entity A receiving in response from directory A the pointer object for the group, thus signifying that the group is not native to forest A;

querying entity A retrieving the address of forest B from the received pointer object;

querying entity A employing the address of forest B to query directory B of forest B for an address of querying entity B of forest B;

querying entity A receiving in response from directory B the address of querying entity B; and querying entity A contacting querying entity B of forest B at the address of querying entity B and requesting querying entity B to query directory B whether the group currently exists, and if the group currently exists, whether the user is a member of the group in forest B, wherein if the group does not currently exist, the user is not a member of the group, and querying entity B queries directory B whether the user is a member of another of the one or more groups named in the signed rights label;

querying entity A receiving in response from querying entity B whether the user is in fact a member of the group in forest B; and querying entity A granting the request within forest A from the user within forest A based at least in part on whether the user is a member of the group in forest B, wherein the querying entity A is a digital rights management (DRM) server.

2. The method of claim 1 further comprising querying entity B querying directory B of forest B to determine whether the user is a member of the group by:

querying entity B querying directory B of forest B to return any object therein for the group, the group being native to forest B such that directory B of forest B has therein a record object corresponding to the group, the record object for the group in directory B including all direct members of the group;

querying entity B receiving in response from directory B the record object for the group, thus signifying that the group is native to forest B; and querying entity B reviewing the direct members of the group as set forth in the record object to determine whether the user is a direct member of the group.

3. The method of claim 2, wherein the user is determined not to be a direct member of the group, and further comprising querying entity B querying directory B to return any object for the user and thus proceeding to determine whether the user is an indirect member of the group by attempting within directory B to find a membership path from the user to the group, whereby a membership path is found from the user to the group establishes that the user is in fact a member of the group;

querying entity B reporting to querying entity A whether the user within forest A is in fact a member of the group based on whether the membership path was found.

4. The method of claim 2 wherein the querying entity B is a DRM server, the method further comprising querying entity A sending to querying entity B an identification of querying entity A as being a DRM server and querying entity B determining based on the sent identification that querying entity A is entitled to be informed whether the user is a member of the group.

5. The method of claim 4 comprising querying entity A sending to querying entity B a digital certificate with a certificate chain leading back to a trusted root of authority as recognized by querying entity B, and querying entity B verifying the certificate.

6. A computer-readable storage medium having stored thereon computer-executable instructions for performing a method for determining whether a user from an organization is a member of a group pre-defined within the organization, wherein the group is identified in a signed rights label that delimits digital licenses that a license server has validated, each digital license specifying a set of rights, the signed rights label naming one or more groups and specifying a set of corresponding rights for each group, the organization maintaining a computer network comprising at least a forest A and a forest B, forest A having a directory A and a querying entity A configured to query directory A, forest B having a directory B and a querying entity B configured to query directory B, the group being native to either forest A or forest B, the method comprising:

Querying entity A receiving a request from the user within forest A for a digital license to render a corresponding piece of digital content within forest A, the request including an identification of the user and an identification of the group;

querying entity A querying directory A of forest A to return any object therein associated with the group, the group instead being native to forest B such that directory B of forest B has therein a record object corresponding to the group, the record object for the group in directory B including all direct members of the group, directory A of forest A having therein a pointer object corresponding to the group, the pointer object in directory A including an address of forest B;

querying entity A receiving in response from directory A the pointer object for the group, thus signifying that the group is not native to forest A;

querying entity A retrieving the address of forest B from the received pointer object;

querying entity A employing the address of forest B to querying directory B of forest B for an address of querying entity B of forest B;

querying entity A receiving in response from directory B the address of querying entity B; and querying entity A contacting querying entity B of forest B at the address of querying entity B and requesting querying entity B to query directory B whether the group currently exists, and if the group currently exists, whether the user is a member of the group in forest B, wherein if the group does not currently exist, the user is not a member of the group, and querying entity B queries directory B whether the user is a member of another of the one or more groups named in the signed rights label;

querying entity A receiving in response from querying entity B whether the user is in fact a member of the group in forest B; and querying entity A granting the request within forest A from the user within forest A based at least in part on whether the user is a member of the group in forest B, wherein the querying entity A is a digital rights management (DRM) server.

7. The medium of claim 6 in combination with another computer-readable medium having stored thereon computer-executable instructions for performing a method comprising querying entity B querying directory B of forest B to determine whether the user is a member of the group by:
   querying entity B querying directory B of forest B to return any object therein for the group, the group being native to forest B such that directory B of forest B has therein a record object corresponding to the group, the record object for the group in directory B including all direct members of the group;
   querying entity B receiving in response from directory B the record object for the group, thus signifying that the group is native to forest B; and
   querying entity B reviewing the direct members of the group as set forth in the record object to determine whether the user is a direct member of the group.

8. The another medium of claim 7 wherein the method further comprises:
   wherein the user is determined to not be a direct member of the group, and further comprising querying entity B querying directory B to return any object for the user and thus proceeding to determine whether the user is an indirect member of the group by attempting within directory B to find a membership path from the user to the group, whereby a membership path found from the user to the group establishes that the user is in fact a member of the group; and
   querying entity B reporting to querying entity A whether the user within forest A is in fact a member of the group based on whether [a] the membership path was found.

9. The medium and another medium of claim 7 wherein the querying entity B is a DRM server, the method of the medium further comprising querying entity A sending to querying entity B an identification of querying entity A as being a DRM server, the method of the another medium further comprising querying entity B determining based on the sent identification that querying entity A is entitled to be informed whether the user is a member of the group.

10. The medium and another medium of claim 9 wherein the method of the medium comprises querying entity A sending to querying entity B a digital certificate with a certificate chain leading back to a trusted root of authority as recognized by querying entity B, and the method of the another medium comprising querying entity B verifying the certificate.

11. The method of claim 2, wherein the user is determined to be a direct member of the group, and further comprising querying entity B reporting to querying entity A that the user is in fact a member of the group.

12. The another medium of claim 7 wherein the user is determined to be a direct member of the group, and wherein the method further comprises querying entity B reporting to querying entity A that the user is in fact a member of the group.

13. A method for determining whether a user from an organization is a member of a group pre-defined within the organization, wherein the group is identified in a signed rights label naming one or more groups and specifying a set of corresponding rights for each group, the organization maintaining a computer network comprising at least a forest A and a forest B, forest A having a directory A and a querying entity A configured to query directory A, forest B having a directory B and a querying entity B configured to query directory B, the group being native to either forest A or forest B, querying entity A and querying entity B both being digital rights management (DRM) servers, the method comprising:
   querying entity A receiving a request from the user within forest A for a digital license to render a corresponding piece of digital content within forest A, the request including an identification of the user and an identification of the group;
   querying entity A querying directory A of forest A to request any object therein associated with the group, the group instead being native to forest B, the directory B of forest B having therein a record object corresponding to the group, the record object for the group in directory B including all direct members of the group, directory A of forest A having therein a pointer object corresponding to the group, the pointed object in directory A including an address of forest B;
   querying entity A receiving in response to the request to directory A the pointed object containing the address of forest B, such pointer object thereby signifying that the group is not native to forest A but is instead native to forest B;
   querying entity A retrieving the address of forest B from the received pointer object;
   querying entity A employing the address of forest B to query directory B of forest B for an address of querying entity B of forest B;
   querying entity A receiving in response from directory B the address of querying entity B;
   querying entity A contacting querying entity B at the address of querying entity B, and requesting querying entity B to query directory B whether the group currently exists, and if the group currently exists, whether the user is a member of the group in forest B, wherein if the group does not currently exist, the user is not a member of the group, the request from querying entity A to querying entity B including an identification of querying entity A as being a DRM server;
   querying entity B determining based on the identification of querying entity A that querying entity A is entitled to be informed whether the user is a member of the group;
   querying entity B querying directory B of forest B to return any object therein for the group;
   querying entity B receiving in response from directory B the record object in directory B for the group;
   querying entity B reviewing the direct members of the group as set forth in the record object to determine whether the user is a direct member of the group, wherein the user is determined to not be a direct member of the group;
   querying entity B querying directory B to return any object for the user and proceeding to determine whether the user is an indirect member of the group by attempting within directory B to find a membership path from the user to the group, whereby the membership path found from the user to the group establishes that the user is in fact a member of the group;
   querying entity B reporting to querying entity A that the user within forest A is in fact a member of the group based on the membership path being found; and
   querying entity A granting the request within forest A from the user within forest A based at least in part on whether the user is a member of the group in forest B.

* * * * *